US011855680B2

(12) United States Patent
Howard

(10) Patent No.: US 11,855,680 B2
(45) Date of Patent: Dec. 26, 2023

(54) RANDOM, SEQUENTIAL, OR SIMULTANEOUS MULTI-BEAM CIRCULAR ANTENNA ARRAY AND BEAM FORMING NETWORKS WITH UP TO 360° COVERAGE

(71) Applicant: John Howard, Upper Mount Bethel, PA (US)

(72) Inventor: John Howard, Upper Mount Bethel, PA (US)

(73) Assignee: John Howard, Upper Mount Bethel, PA (US)

( * ) Notice: Subject to any disclaimer, the term of this patent is extended or adjusted under 35 U.S.C. 154(b) by 63 days.

(21) Appl. No.: 16/891,244

(22) Filed: Jun. 3, 2020

(65) Prior Publication Data

US 2020/0295799 A1    Sep. 17, 2020

Related U.S. Application Data

(63) Continuation-in-part of application No. 14/227,634, filed on Mar. 27, 2014, now Pat. No. 10,734,733.
(Continued)

(51) Int. Cl.
*H01Q 21/20* (2006.01)
*H04B 1/58* (2006.01)
(Continued)

(52) U.S. Cl.
CPC .......... *H04B 1/583* (2013.01); *H04B 1/0458* (2013.01); *H04B 7/043* (2013.01)

(58) Field of Classification Search
CPC ...... H04B 1/583; H04B 1/0458; H04B 7/043; H04B 7/0617; H01Q 3/40
See application file for complete search history.

(56) References Cited

U.S. PATENT DOCUMENTS 3,736,592 A * 5/1973 Coleman ............. H01Q 3/2647
342/370
3,906,502 A    9/1975 Connolly
(Continued)

FOREIGN PATENT DOCUMENTS

EP    2846401 A1    3/2015
WO    2005/122328 A2    12/2005

OTHER PUBLICATIONS

European Search Report for corresponding European Application No. EP14172161, dated Jan. 23, 2015.
(Continued)

*Primary Examiner* — Hai V Tran
*Assistant Examiner* — Bamidele A Immanuel
(74) *Attorney, Agent, or Firm* — FISHERBROYLES, LLP

(57) ABSTRACT

A beam forming network system includes a first beam forming network having first and second ports, in which each of the first ports is operatively coupled to an antenna element; and a second beam forming network including third and fourth ports, in which each of the third ports is operatively coupled to one of the second ports using at least one of a phase shifter, attenuator, power divider, and/or hybrid coupler. A method of beam forming includes coupling each of the first ports associated with a first beam forming network operatively to one antenna element, and coupling each of the third ports associated with a second beam forming network operatively to one of the second ports associated with the first beam forming network using at least one of a phase shifter, attenuator, power divider, and/or hybrid coupler.

42 Claims, 19 Drawing Sheets

Related U.S. Application Data

(60) Provisional application No. 61/874,407, filed on Sep. 6, 2013.

(51) Int. Cl.
*H04B 1/04* (2006.01)
*H04B 7/0426* (2017.01)

(56) References Cited

U.S. PATENT DOCUMENTS

| | | | | |
|---|---|---|---|---|
| 3,997,900 | A * | 12/1976 | Chin | H01Q 25/004 343/705 |
| 4,090,199 | A * | 5/1978 | Archer | H01Q 3/2658 342/353 |
| 4,257,050 | A * | 3/1981 | Ploussios | H01Q 3/40 342/372 |
| 4,408,205 | A * | 10/1983 | Hockham | H01Q 3/2617 342/368 |
| 4,652,879 | A * | 3/1987 | Rudish | G01S 13/426 342/373 |
| 4,814,775 | A * | 3/1989 | Raab | H01Q 25/00 342/368 |
| 4,965,605 | A * | 10/1990 | Chang | H01Q 3/24 343/846 |
| 4,980,692 | A * | 12/1990 | Rudish | H01Q 3/40 343/778 |
| 4,989,011 | A * | 1/1991 | Rosen | H01Q 25/04 342/373 |
| 5,038,150 | A * | 8/1991 | Bains | H01Q 25/001 342/373 |
| 5,151,706 | A * | 9/1992 | Roederer | H01Q 3/40 342/372 |
| 5,179,386 | A * | 1/1993 | Rudish | H01Q 3/40 342/373 |
| 5,325,101 | A * | 6/1994 | Rudish | H01Q 21/205 342/372 |
| 5,410,320 | A * | 4/1995 | Rudish | H01Q 3/40 342/368 |
| 5,430,453 | A * | 7/1995 | Rudish | G01S 13/426 342/373 |
| 5,493,306 | A * | 2/1996 | Rudish | H01Q 3/2682 342/372 |
| 5,610,617 | A * | 3/1997 | Gans | H01Q 3/24 342/372 |
| 5,929,804 | A | 7/1999 | Jones et al. | |
| 5,936,588 | A * | 8/1999 | Rao | H01Q 3/24 342/372 |
| 5,936,591 | A * | 8/1999 | Yamasa | H04B 7/18515 342/373 |
| 6,141,567 | A * | 10/2000 | Youssefmir | H04B 7/0615 375/349 |
| 6,252,560 | B1 * | 6/2001 | Tanaka | H01Q 25/00 342/371 |
| 6,791,507 | B2 | 9/2004 | Johansson et al. | |
| 6,864,853 | B2 | 3/2005 | Judd et al. | |
| 6,970,142 | B1 * | 11/2005 | Pleva | H01Q 1/3283 343/876 |
| 6,992,621 | B2 | 1/2006 | Casas et al. | |
| 6,992,622 | B1 * | 1/2006 | Chiang | H01Q 25/02 342/373 |
| 6,995,730 | B2 * | 2/2006 | Pleva | G01S 7/4004 343/876 |
| 7,180,447 | B1 * | 2/2007 | Jacomb-Hood | H01Q 3/36 342/373 |
| 7,248,215 | B2 * | 7/2007 | Pleva | H01Q 25/00 342/368 |
| 7,369,085 | B1 * | 5/2008 | Jacomb-Hood | H01Q 3/36 342/372 |
| 7,567,213 | B2 | 5/2009 | Liu | |
| 7,804,358 | B2 * | 9/2010 | Petersson | H01Q 21/22 330/53 |
| 8,068,878 | B2 * | 11/2011 | Raffaelli | H01Q 1/246 455/562.1 |
| 8,345,716 | B1 * | 1/2013 | Ehret | H04B 7/10 455/562.1 |
| 8,604,989 | B1 * | 12/2013 | Olsen | H01Q 3/40 343/754 |
| 9,294,176 | B2 * | 3/2016 | Weiler | H04W 76/10 |
| 9,444,534 | B2 * | 9/2016 | Khan | H04B 7/0408 |
| 2002/0171585 | A1 * | 11/2002 | Eiges | H01Q 25/00 342/361 |
| 2003/0038752 | A1 * | 2/2003 | Park | H01Q 3/40 343/757 |
| 2003/0098814 | A1 | 5/2003 | Keller, III et al. | |
| 2003/0146880 | A1 * | 8/2003 | Chiang | H01Q 1/246 343/853 |
| 2004/0160374 | A1 * | 8/2004 | Johansson | H01Q 25/00 343/757 |
| 2005/0259005 | A1 * | 11/2005 | Chiang | H01Q 25/00 342/373 |
| 2005/0285784 | A1 * | 12/2005 | Chiang | H04B 7/0808 342/359 |
| 2006/0022884 | A1 * | 2/2006 | Hayashi | H01Q 3/2623 343/757 |
| 2006/0145919 | A1 * | 7/2006 | Pleva | H01Q 1/3283 342/368 |
| 2007/0093271 | A1 * | 4/2007 | Hovers | H01Q 1/246 455/562.1 |
| 2007/0257858 | A1 * | 11/2007 | Liu | H01Q 1/007 343/893 |
| 2009/0005121 | A1 * | 1/2009 | Wong | H01Q 3/26 455/562.1 |
| 2009/0009392 | A1 * | 1/2009 | Jacomb-Hood | H01Q 1/288 342/374 |
| 2009/0028225 | A1 * | 1/2009 | Runyon | H04B 1/18 375/219 |
| 2010/0066590 | A1 | 3/2010 | Brown et al. | |
| 2011/0032849 | A1 * | 2/2011 | Yeung | H04B 7/0617 370/328 |
| 2011/0102263 | A1 * | 5/2011 | Angeletti | H01Q 3/40 342/373 |
| 2012/0206291 | A1 * | 8/2012 | Schuman | H01Q 3/242 342/174 |
| 2013/0044650 | A1 * | 2/2013 | Barker | H04B 7/0671 455/562.1 |
| 2013/0121185 | A1 * | 5/2013 | Li | H04B 7/0617 370/252 |
| 2013/0214973 | A1 * | 8/2013 | Veihl | H01Q 3/40 333/2 |
| 2013/0229308 | A1 * | 9/2013 | Pu | H01Q 3/40 342/373 |
| 2013/0281159 | A1 * | 10/2013 | Ai | H01Q 25/00 455/562.1 |
| 2014/0029461 | A1 * | 1/2014 | Kinamon | H04W 72/0453 370/252 |
| 2014/0341261 | A1 * | 11/2014 | Weiler | H04W 76/10 375/296 |
| 2014/0375518 | A1 * | 12/2014 | Powell | H01Q 21/0006 343/816 |
| 2015/0070241 | A1 | 3/2015 | Howard et al. | |
| 2015/0341098 | A1 * | 11/2015 | Angeletti | H01Q 3/40 375/267 |
| 2015/0349421 | A1 * | 12/2015 | Sharawi | H01Q 21/0006 342/373 |
| 2016/0240922 | A1 * | 8/2016 | Veihl | H01Q 1/246 |

OTHER PUBLICATIONS

Non-Final Office Action received for U.S. Appl. No. 14/227,634 dated Oct. 9, 2015, 32 pages.
Ireland et al. Dielectric Embedded Multi-Beam Adaptive Array Antenna, Journal of the Japan Society of AppliedElectromagnetics and Mechanics, vol. 15, Supplement (2007).
Panduro et al. Simplifying the Feeding Network for Multi-Beam Circular Antenna Arrays by Using Corps, Progress inElectromagnetics Research Letters, vol. 21, 119-128, 2011.
Final Office Action received for U.S. Appl. No. 14/227,634 dated Mar. 23, 2016, 11 pages.

(56) References Cited

OTHER PUBLICATIONS

Non-Final Office Action received for U.S. Appl. No. 14/227,634 dated Jan. 4, 2017, 13 pages.
Final Office Action received for U.S. Appl. No. 14/227,634 dated Jun. 14, 2017, 18 pages.
Bhowmik et al. "Optimum Design of a 4×4 Planar Butler Matrix Array for WLAN Application, Journal of Telecommunications, vol. 2, Issue 1, Apr. 2010".
Non-Final Office Action received for U.S. Appl. No. 14/227,634 dated May 8, 2018, 24 pages.
Cetinoneri et al. "An 8 × 8 Butler Matrix in 0.13-um CMOS for 5-6-GHz Multibeam Applications, IEEE Transactions on Microwave Theory and Techniques, vol. 59, No. 2, Feb. 2011."
Final Office Action received for U.S. Appl. No. 14/227,634 dated Nov. 29, 2018, 16 pages.
Non-Final Office Action received for U.S. Appl. No. 14/227,634 dated Jun. 10, 2019, 15 pages.
Communication pursuant to Article 94(3) EPC received for EP Patent Application Serial No. 14172161.3 dated Feb. 24, 2016, 7 page.
Communication pursuant to Article 94(3) EPC received for EP Patent Application Serial No. 14172161.3 dated Oct. 6, 2016, 8 page.
Final Office Action received for U.S. Appl. No. 14/227,634 dated Dec. 9, 2019, 18 pages.
Notice of Allowance received for U.S. Appl. No. 14/227,634 dated Apr. 10, 2020, 17 pages.
Office Action for corresponding Application No. 14172161.3, dated Aug. 21, 2017, 11 pages.

\* cited by examiner

RANDOM, SEQUENTIAL, OR SIMULTANEOUS MULTI-BEAM CIRCULAR ANTENNA ARRAY AND BEAM FORMING NETWORKS WITH UP TO 360° COVERAGE

CROSS-REFERENCE TO RELATED APPLICATION

This application is a continuation-in-part application of U.S. application Ser. No. 14/227,634, filed Mar. 27, 2014, which claims the benefit of U.S. Provisional Application No. 61/874,407, filed Sep. 6, 2013, the disclosures of which are incorporated by reference herein in their entireties.

BACKGROUND

Field

Embodiments of the invention generally relate to antennas and, more particularly, relate to random, sequential or simultaneous multi-beam antenna arrays with up to 360° antenna coverage.

SUMMARY

In accordance with one embodiment, a beam forming network system is disclosed, which includes a first beam forming network including a plurality of first ports and a plurality of second ports, in which each of the plurality of first ports is configured to be operatively coupled to one of a plurality of antenna elements; a second beam forming network including a plurality of third ports and a plurality of fourth ports, in which each of the plurality of third ports is operatively coupled to one of the plurality of second ports; and a switch sequentially coupling each of the plurality of fourth ports to a signal by sweeping the switch through a plurality of positions, thereby enabling the plurality of antenna elements to provide sequential 360° coverage.

The first beam forming network may be a K×N beam forming network, in which K is greater than or equal to N, and the second beam forming network may be an N×M beam forming network, in which M is less than or equal to N. At least one of the first beam forming network, second beam forming network may include at least one of a Butler matrix, Blass matrix, Nolen matrix, Shelton matrix, McFarland matrix, Davis matrix.

In accordance with another embodiment, a method of beam forming, is disclosed, which includes coupling each of a plurality of first ports associated with a first beam forming network operatively to one of a plurality of antenna elements; coupling each of a plurality of third ports associated with a second beam forming network operatively to one of a plurality of second ports associated with the first beam forming network; and coupling each of a plurality of fourth ports associated with the second beam forming network sequentially to a signal by sweeping a switch through a plurality of positions, thereby enabling the antenna elements to provide sequential 360° coverage.

The first beam forming network may be a K×N beam forming network, in which K is greater than or equal to N, and the second beam forming network may be an N×M beam forming network, in which M is less than or equal to N. At least one of the first beam forming network, second beam forming network may include at least one of a Butler matrix, Blass matrix, Nolen matrix, Shelton matrix, McFarland matrix, Davis matrix.

In accordance with another embodiment, a beam forming network system is disclosed, which includes at least one first beam forming network including a plurality of first ports and a plurality of second ports, in which each of the plurality of first ports is configured to be operatively coupled to one of a plurality of antenna elements; and at least one second beam forming network including a plurality of third ports and a plurality of fourth ports, in which each of the plurality of third ports being operatively coupled to one of the plurality of second ports using at least one of a first variable phase shifter, first fixed phase shifter, first attenuator, first power divider, first hybrid coupler.

The first beam forming network may be an MN×MN beam forming network, in which N is an integer greater than or equal to one (1) and M is an integer greater than or equal to one (1); the second beam forming network may be an N×N beam forming network, in which N is an integer greater than or equal to one (1); and the first beam forming network may be an N×(N+M) beam forming network, in which N is an integer greater than or equal to one (1)) and M is an integer greater than or equal to one (1). At least one of the first beam forming network, second beam forming network may include at least one of a Butler matrix, Blass matrix, Nolen matrix, Shelton matrix, McFarland matrix, Davis matrix. The first hybrid coupler may include at least one of a 90 degree hybrid coupler, 180 degree hybrid coupler. At least one of amplitude, phase may be controlled for sidelobe reduction in at least one of azimuth, elevation using at least one of the first variable phase shifter, first fixed phase shifter, first attenuator, first power divider, first hybrid coupler. The first beam forming network may be an N×N beam forming network, in which N is an integer greater than or equal to one (1). Each of the plurality of fourth ports may be configured to be operatively coupled to a switch operatively coupling each of the plurality of fourth ports to a signal by sweeping the switch through a plurality of positions. Each of the plurality of fourth ports may be configured to be operatively coupled to one of a plurality of transceivers operatively coupling one of the plurality of fourth ports to a signal. The plurality of antenna elements may be configured in at least one of a circle, cylinder, semi-circle, arc, line, sphere, conformal shape, curvilinear shape. The beam forming network system may include at least one third beam forming network including a plurality of fifth ports and a plurality of sixth ports, in which the plurality of fifth ports is configured to be operatively coupled to a one of the plurality of fourth ports. The beam forming network system may include at least one fourth beam forming network including a plurality of seventh ports and a plurality of eighth ports, in which each of the plurality of seventh ports is operatively coupled to one of the plurality of sixth ports using at least one of a second variable phase shifter, second fixed phase shifter, second attenuator, second power divider, second hybrid coupler. The second hybrid coupler may include at least one of a 90 degree hybrid coupler, 180 degree hybrid coupler. At least one of amplitude, phase may be controlled for sidelobe reduction in at least one of azimuth, elevation using at least one of the second variable phase shifter, second fixed phase shifter, second attenuator, second power divider, second hybrid coupler. Each of the plurality of eighth ports may be configured to be operatively coupled to a switch selectively coupling each of the plurality of eighth ports to a signal by sweeping the switch through a plurality of positions. Each of the plurality of eighth ports may be configured to be operatively coupled to one of a plurality of transceivers operatively coupling one of the plurality of eighth ports to a signal. The second beam forming network may include a power divider.

In accordance with another embodiment, a method of beam forming is disclosed, which includes coupling each of a plurality of first ports associated with at least one first beam forming network operatively to one of a plurality of antenna elements and coupling each of a plurality of third ports associated with at least one second beam forming network operatively to one of a plurality of second ports associated with the first beam forming network using at least one of a first variable phase shifter, first fixed phase shifter, first attenuator, first power divider, first hybrid coupler.

The first beam forming network may be an MN×MN beam forming network, in which N is an integer greater than or equal to one (1) and M is an integer greater than or equal to one (1); the second beam forming network may be an N×N beam forming network, in which N is an integer greater than or equal to one (1); and the first beam forming network may be an N×(N+M) beam forming network, in which N is an integer greater than or equal to one (1)) and M is an integer greater than or equal to one (1). At least one of the first beam forming network, second beam forming network may include at least one of a Butler matrix, Blass matrix, Nolen matrix, Shelton matrix, McFarland matrix, Davis matrix. The first hybrid coupler may include at least one of a 90 degree hybrid coupler, 180 degree hybrid coupler. The method may include controlling at least one of amplitude, phase for sidelobe reduction in at least one of azimuth, elevation using at least one of the first variable phase shifter, first fixed phase shifter, first attenuator, first power divider, first hybrid coupler. The first beam forming network may be an N×N beam forming network, in which N is an integer greater than or equal to one (1). The method may include coupling each of a plurality of fourth ports associated with the second beam forming network operatively to a switch operatively coupling each of the plurality of fourth ports to a signal by sweeping the switch through a plurality of positions. The method may include coupling each of a plurality of fourth ports associated with the second beam forming network operatively to one of a plurality of transceivers operatively coupling one of the plurality of fourth ports to a signal. The plurality of antenna elements may be configured in at least one of a circle, cylinder, semi-circle, arc, line, sphere, conformal shape, curvilinear shape. The method may include coupling a plurality of fifth ports associated with at least one third beam forming network operatively to one of a plurality of fourth ports associated with the second beam forming network. The method may include coupling each of a plurality of seventh ports associated with at least one fourth beam forming network operatively to one of a plurality of sixth ports associated with the at least one third beam forming network using at least one of a second variable phase shifter, second fixed phase shifter, second attenuator, second power divider, second hybrid coupler. The second hybrid coupler may include at least one of a 90 degree hybrid coupler, 180 degree hybrid coupler. The method may include controlling at least one of amplitude, phase for sidelobe reduction in at least one of azimuth, elevation using at least one of the second variable phase shifter, second fixed phase shifter, second attenuator, second power divider, second hybrid coupler. The method may include coupling a plurality of eighth ports associated with the at least one fourth beam forming network operatively to a switch selectively coupling each of the plurality of eighth ports to a signal by sweeping the switch through a plurality of positions. The method may include coupling a plurality of eighth ports associated with the at least one fourth beam forming network operatively to one of a plurality of transceivers operatively coupling one of the plurality of eighth ports to a signal. The second beam forming network may include a power divider.

Other embodiments of the invention will become apparent from the following detailed description considered in conjunction with the accompanying drawings. It is to be understood, however, that the drawings are designed as an illustration only and not as a definition of the limits of any embodiments of the invention.

BRIEF DESCRIPTION OF THE DRAWINGS

The following drawings are provided by way of example only and without limitation, wherein like reference numerals (when used) indicate corresponding elements throughout the several views, and wherein.

It is to be appreciated that elements in the figures are illustrated for simplicity and clarity. Common but well-understood elements, which are useful or necessary in a commercially feasible embodiment, are not shown in order to facilitate a less hindered view of the illustrated embodiments.

DETAILED DESCRIPTION

Embodiments disclosed herein replace variable phase shifters and fixed phase shifters with a Butler matrix beam forming network. Phase and/or amplitude tapering is used to generate narrow beams with reduced sidelobes in azimuth and/or elevation. The elements of the array may be omni and/or directional radiators in broad and/or narrow band configurations.

Figure 1:
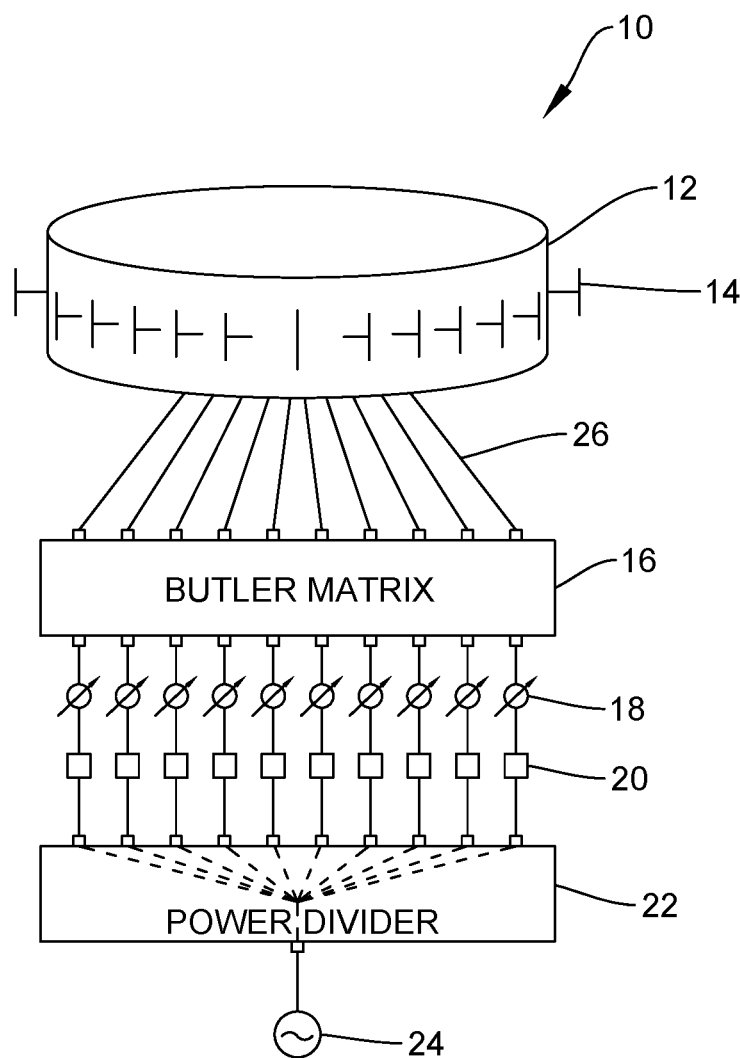
FIG. 1 shows a matrix fed circular array for continuous scanning.

FIG. 1 shows a matrix fed circular array 10 configured for continuous scanning. The matrix fed circular antenna array 10 includes a circular antenna array 12, a plurality of antenna elements 14, a Butler matrix 16, variable phase shifters 18, fixed phase shifters 20, and a power divider 22. The circular antenna array 12 is coupled to output ports of the Butler matrix 16 by lines 26 of equal length. Each input port of the Butler matrix 16 is coupled to an output port of the power divider 22 through a variable phase shifter 18 and a fixed phase shifter 20. The power divider 22 is coupled to a transceiver 24.

Figure 2:
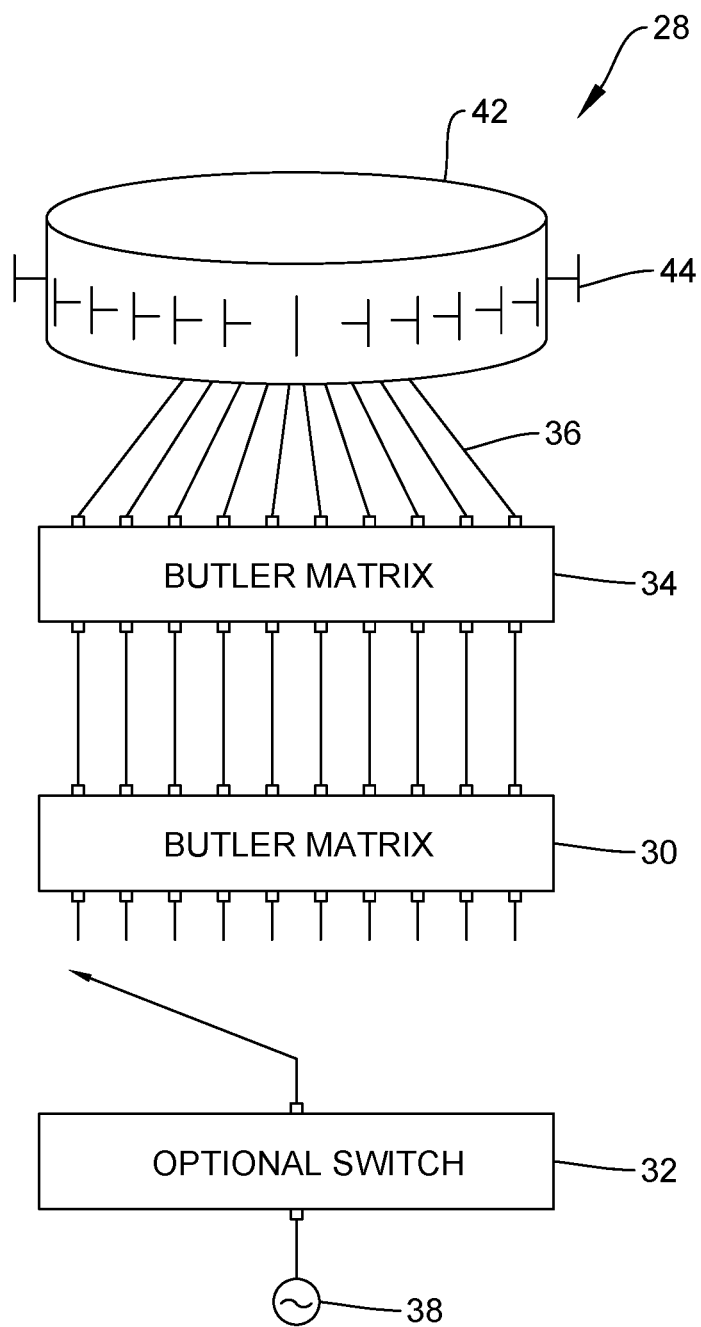
FIG. 2 shows an embodiment of a circular antenna array, in which variable and fixed phase shifters shown in FIG. 1 have been replaced with a Butler matrix.

FIG. 2 shows a first embodiment 28, which includes a circular array 42, a plurality of antenna elements 44, a first Butler matrix 34, a second Butler matrix 30, and an optional switch 32. The switch 32 can be an analog or a digital switch that selectively directs one or more signals to produce a beam in a certain location of 360° depending on which input of the Butler matrix is chosen. By sweeping through the positions of the switch 32, the beam can be swept to cover a 360° footprint.

Each of the antenna elements 44 in the circular array 42 is coupled to an output port of the first Butler matrix 34 by lines 36 of equal length. Each input port of the first Butler matrix 34 is coupled to an output port of the second Butler matrix 30. The second Butler matrix 30 effectively replaces the variable phase shifters 18 and fixed phase shifters 20 shown in FIG. 1. The optional switch 32 selectively couples input ports of the second Butler matrix 30 to a transceiver 38, and allows a user to switch through each beam to achieve simultaneous or sequential 360° coverage. For example, if the switch 32 applies the signal from the transceiver 38 to each of the inputs of the second Butler matrix, simultaneous 360° coverage is achieved. In addition, if the switch 32 sequentially applies the signal from the transceiver 38 to each of the inputs of the second Butler matrix, sequential 360° coverage is achieved. Further, if the switch 32 applies the signal from the transceiver 38 to less than all of the inputs of the second Butler matrix, partial coverage is achieved. The use of two Butler matrices 30, 34 enables antenna transmissions to cover 360° simultaneously, which cannot be performed using conventional antenna systems.

Figure 3:
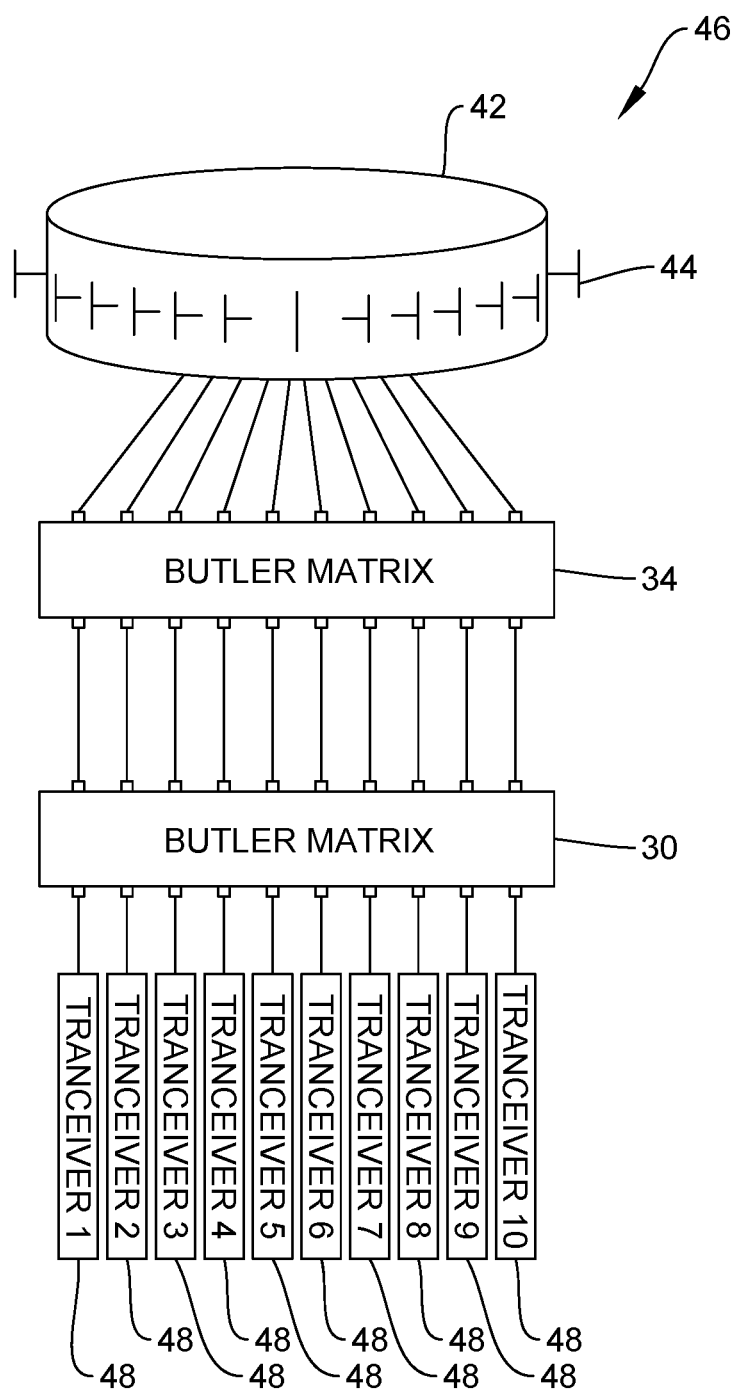
FIG. 3 shows another embodiment of a circular antenna array, in which variable and fixed phase shifters shown in FIG. 1 have been replaced with a Butler matrix.

FIG. 3 shows a second embodiment having ten (10) input ports to the second Butler matrix 30. If the Butler matrix 30 is configured correctly, an antenna beam is provided every 36°, that is, at 0°, 36°, 72°, etc. If each of the input ports of the second Butler matrix 30 is connected to a transceiver 48, as shown in FIG. 3, transmissions can occur simultaneously or sequentially at 360°. In contrast, conventional approaches, such as that shown in FIG. 1, include variable phase shifters 18 and fixed phase shifters 20 that can only sweep through an arc of a predetermined number of degrees in a manner that is similar to a clock's second hand that moves slowly around a central axis. However, this conventional approach provides discontinuous and non-simultaneous coverage over the predetermined arc. Since the variable phase shifters 18 and fixed phase shifters 20 require a certain amount of time to sweep through the predetermined arc, a potential target may be missed or may be allowed to pass through the predetermined arc without being detected due to latency in the phase shifters 18, 20. The second embodiment 46 shown in FIG. 3 enables connection of a multi-output transceiver 48 to couple each of the outputs of the second Butler matrix 30 to one or more transceivers 48 to provide 360° coverage.

Further, variable, fixed, and/or digital phase shifters are not as reliable as Butler matrices because the phase shifters are active and not passive. However, Butler matrices are passive and thus more robust and less likely to fail. In addition, Butler matrices can be made to cover a very broad band, which is larger than that of variable, fixed, and/or digital phase shifters.

Thus, the embodiments disclosed herein provide for random, simultaneous and/or sequential 360° antenna coverage without the necessity of scanning. Although 10 (input)×10 (output) Butler matrices are shown and described herein, it is to be understood that any configuration of Butler matrix, such as 8×8, 16×16, and the like may be used while remaining within the intended scope of the disclosure.

Figure 4:
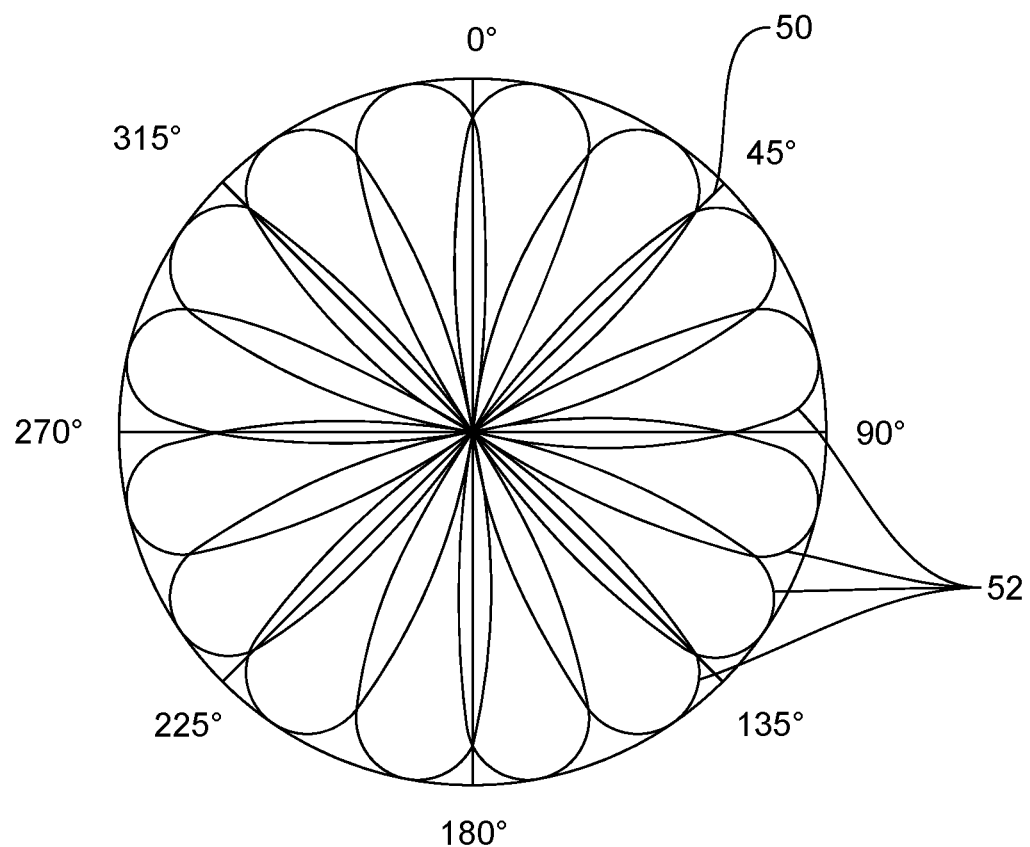
FIG. 4 shows an antenna beam pattern providing 360° coverage.

FIG. 4 shows an antenna beam pattern 50 with lobes 52 that shows an example of simultaneous 360° antenna coverage provided by the embodiment disclosed herein. In contrast, conventional approaches can only provide for an antenna pattern including fewer than each of the lobes 52, which are swept through a predetermined arc as function of time and cannot provide for 360° coverage at any given moment in time as shown in FIG. 4. Any combination of beams can be used to provide the 360° coverage, such as without limitation 2, 4, 6, 8, 24, and the like beams. The combination of beams depends on the construction and phase of the Butler matrices. The crossing and/or overlap between beams can also vary depending on the design of the Butler matrices.

Figure 5:
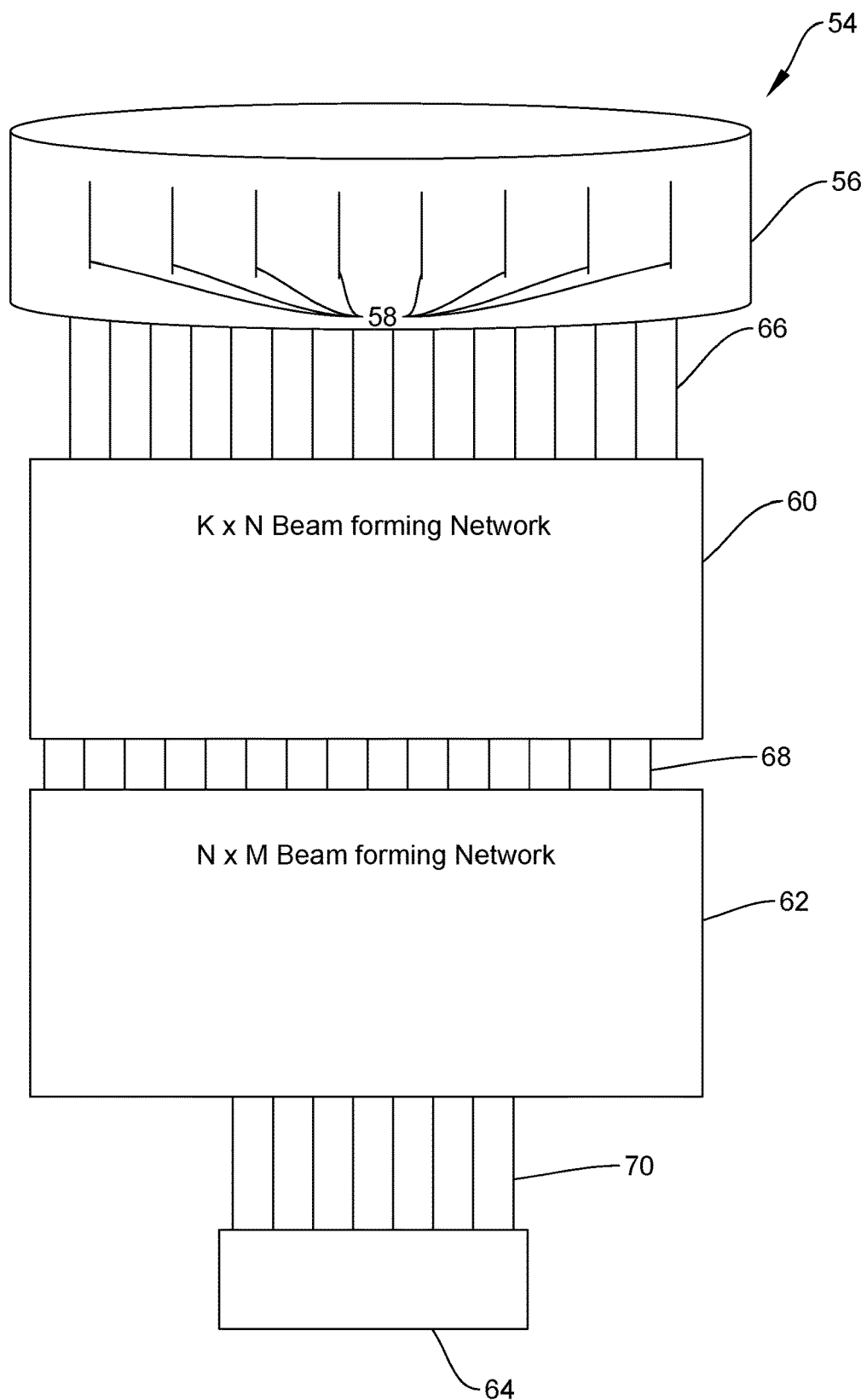
FIG. 5 shows another embodiment of a circular antenna array, in which the Butler matrices shown in FIG. 3 are implemented as K×N and N×M beam forming networks.

FIG. 5 shows a third embodiment 54, which includes a circular antenna array 56, a plurality of antenna elements 58, a first non-square (K×N) beam forming network 60, a second non-square (N×M) beam forming network 62, and a plurality of transceivers 64. In the depicted embodiment, the first and second beam forming networks are K×N and N×M beam forming networks, respectively. The circular antenna array 56 includes the plurality of antenna elements 58 and is operatively coupled to the first non-square (K×N) beam forming network 60. The first non-square (K×N) beam forming network 60 is operatively coupled to the second non-square (N×M) beam forming network 62, which is operatively coupled to the plurality of transceivers 64. It should be understood that each of the beam forming networks 60, 62 is not limited to a Butler matrix. Other beam forming networks such as at least one of a Butler matrix, Blass matrix, Nolen matrix, Shelton matrix, McFarland matrix, and/or Davis matrix may be used as well.

Each of the antenna elements 58 in the circular array 56 is coupled to an output port of the K×N beam forming network 60 using K lines 66 of substantially equal length. Each input port of the K×N beam forming network 60 is coupled to an output port of the N×M beam forming network 62 by N lines 68 of substantially equal length. A combination of the K×N beam forming network 60 and the N×M beam forming network 62 effectively replaces the variable phase shifters 18 and fixed phase shifters 20 shown in FIG. 1. Each of the input ports of the N×M beam forming network 62 is connected to each of the plurality of transceivers 64 using M lines 70 of substantially equal length such that transmission and/or reception can occur simultaneously or sequentially at 360°. In another embodiment, each of the input ports of the N×M beam forming network 62 may be connected to a switch, such as the switch 32 shown in FIG. 2, such that transmission and/or reception can occur simultaneously or sequentially at 360°. These embodiments provide unique radiation patterns that are different and distinct from antenna array systems using traditional square (N×N) Butler matrices. The quantity of K lines 66 is greater than or equal to the quantity of N lines 68, and the quantity of M lines 70 is less than or equal to the quantity of N lines 68.

Figure 6:
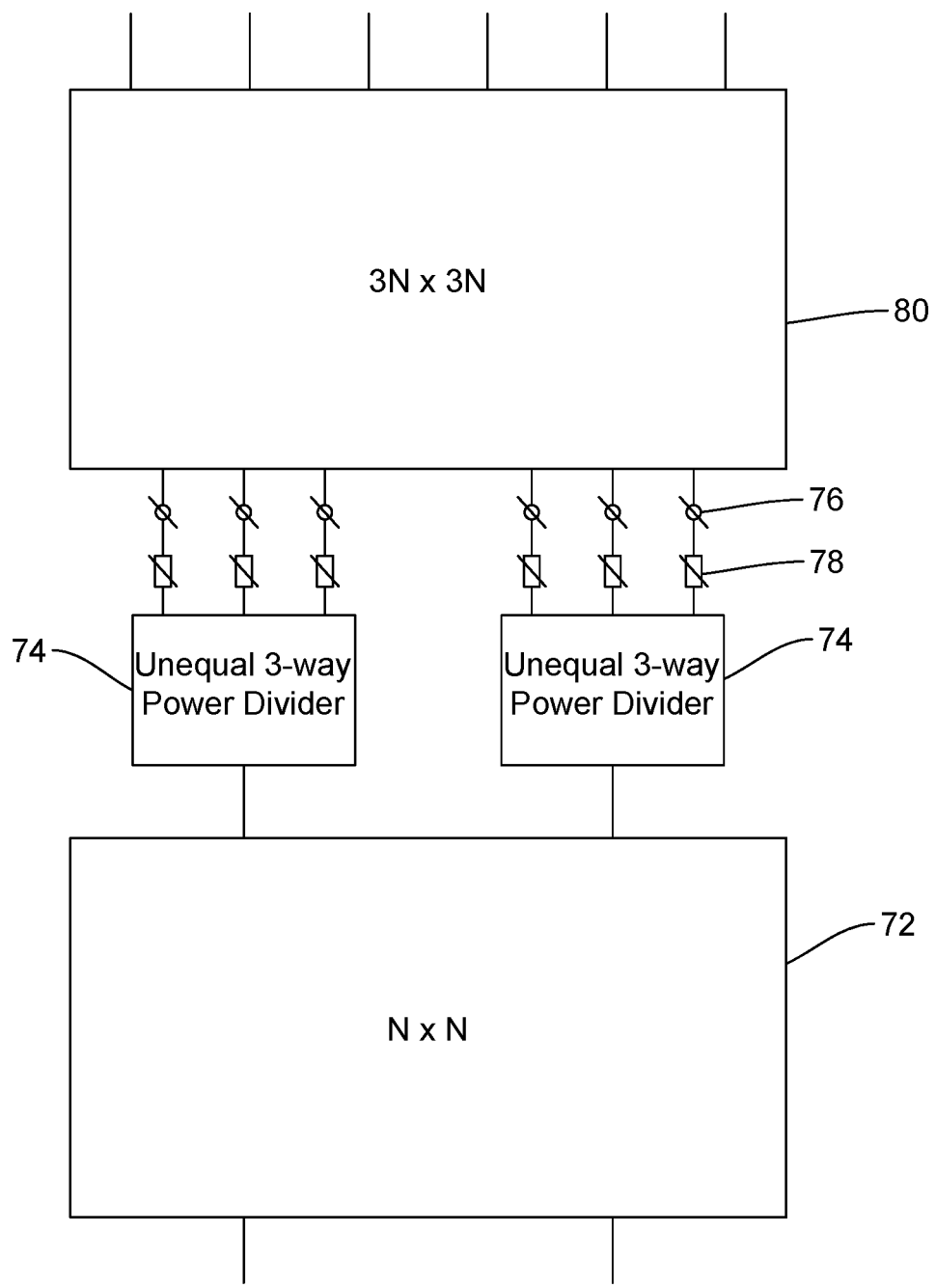
FIG. 6 shows another embodiment, in which an N×N beam forming network is connected to a 3N×3N beam forming network using variable phase shifters, fixed phase shifters, and three-way power dividers, which include an even or uneven power split.
Figure 7:
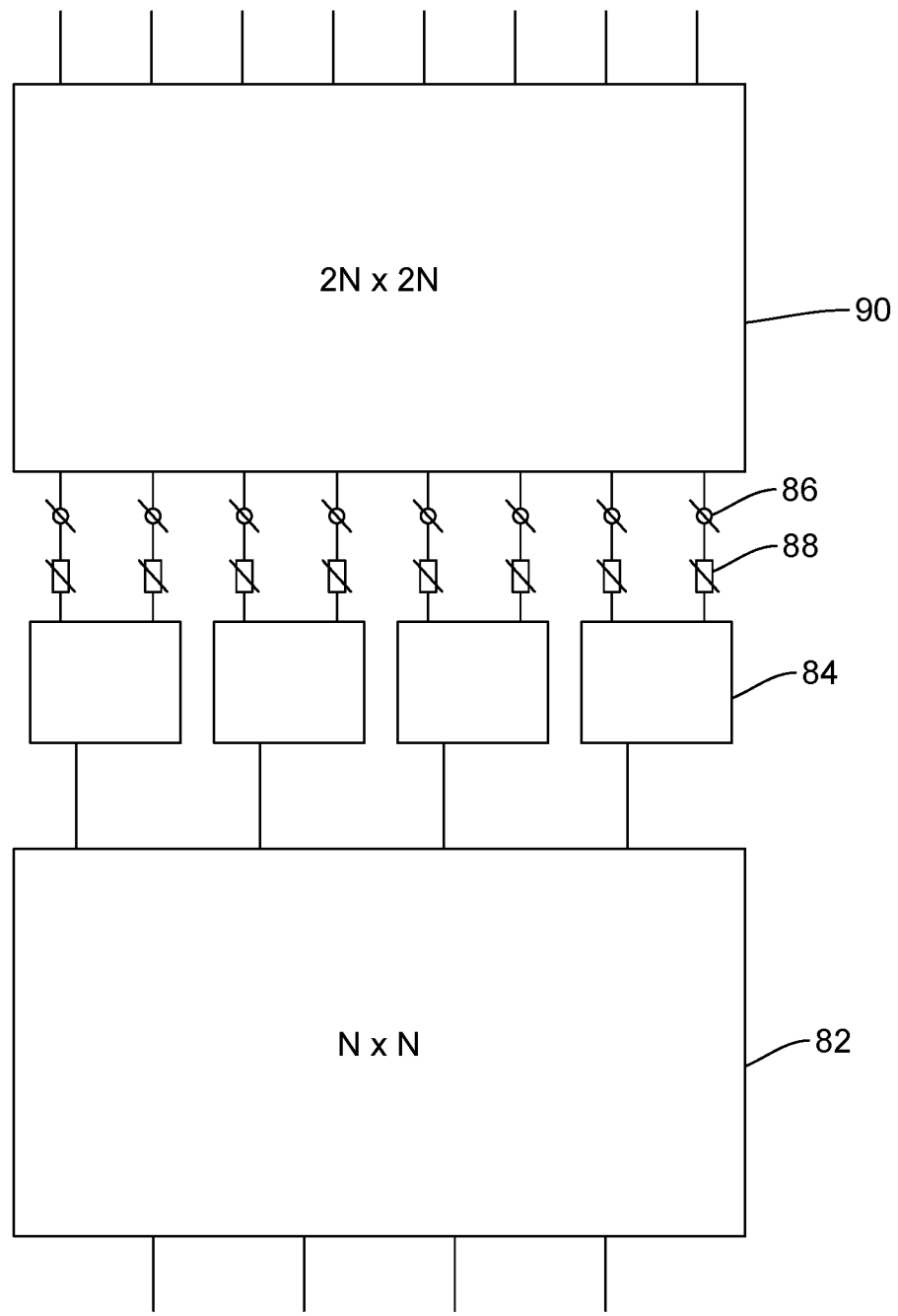
FIG. 7 shows another embodiment, in which an N×N beam forming network is connected to a 2N×2N beam forming network using variable phase shifters, fixed phase shifters, and 180 degree hybrid couplers.
Figure 8:
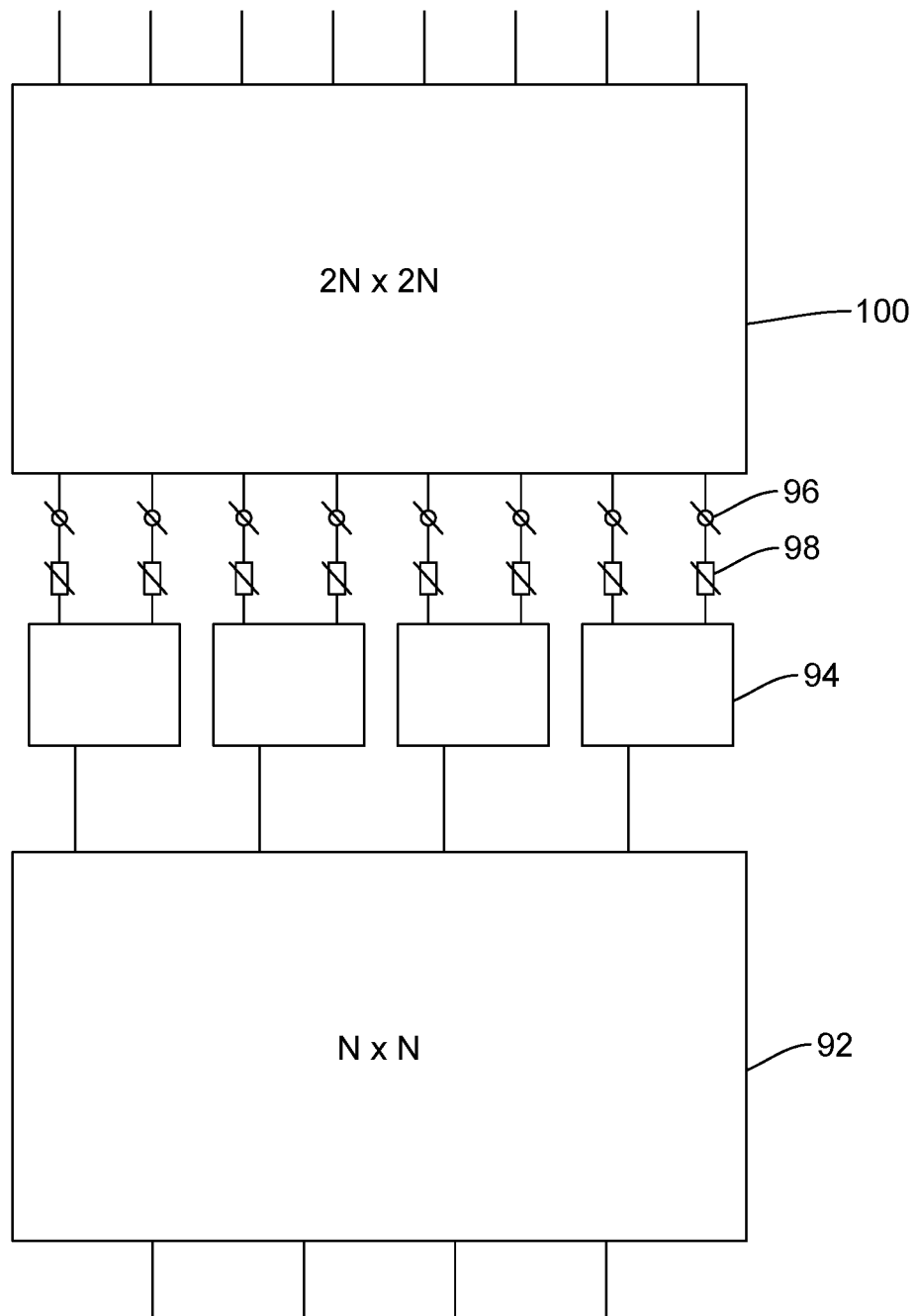
FIG. 8 shows another embodiment, in which an N×N beam forming network is connected to a 2N×2N beam forming network using variable phase shifters, fixed phase shifters, and 90 degree hybrid couplers.

FIGS. 6-8 illustrate examples of multibeam antenna systems implemented using unequal or equal beamforming networks. For example, FIG. 6 shows another embodiment, in which an N×N beam forming network 72 is operatively coupled to a MN×MN beamforming network 80, in which M=3, using one or more variable phase shifters 76, fixed phase shifters 78, and/or three-way power dividers 74, which include an even or uneven power split. M can be any integer greater than or equal to two (2). M can also be equal to one (1), which results in a retro-directive antenna.

FIG. 7 shows another embodiment, in which an N×N beam forming network 82 is operatively coupled to a MN×MN beam forming network 90, in which M=2, using one or more variable phase shifters 86, fixed phase shifters 88, and/or 180 degree hybrid couplers 84. M can be any integer greater than or equal to two (2). M can also be equal to one (1), which results in a retro-directive antenna.

FIG. 8 shows another embodiment of the disclosed subject matter, in which an N×N beam forming network 92 is operatively coupled to a MN×MN beam forming network 100, in which M=2, using one or more variable phase shifters 96, fixed phase shifters 98, and/or 90 degree hybrid couplers 94. M can be any integer greater than or equal to two (2). M can also be equal to one (1), which results in a retro-directive antenna.

Figure 9:
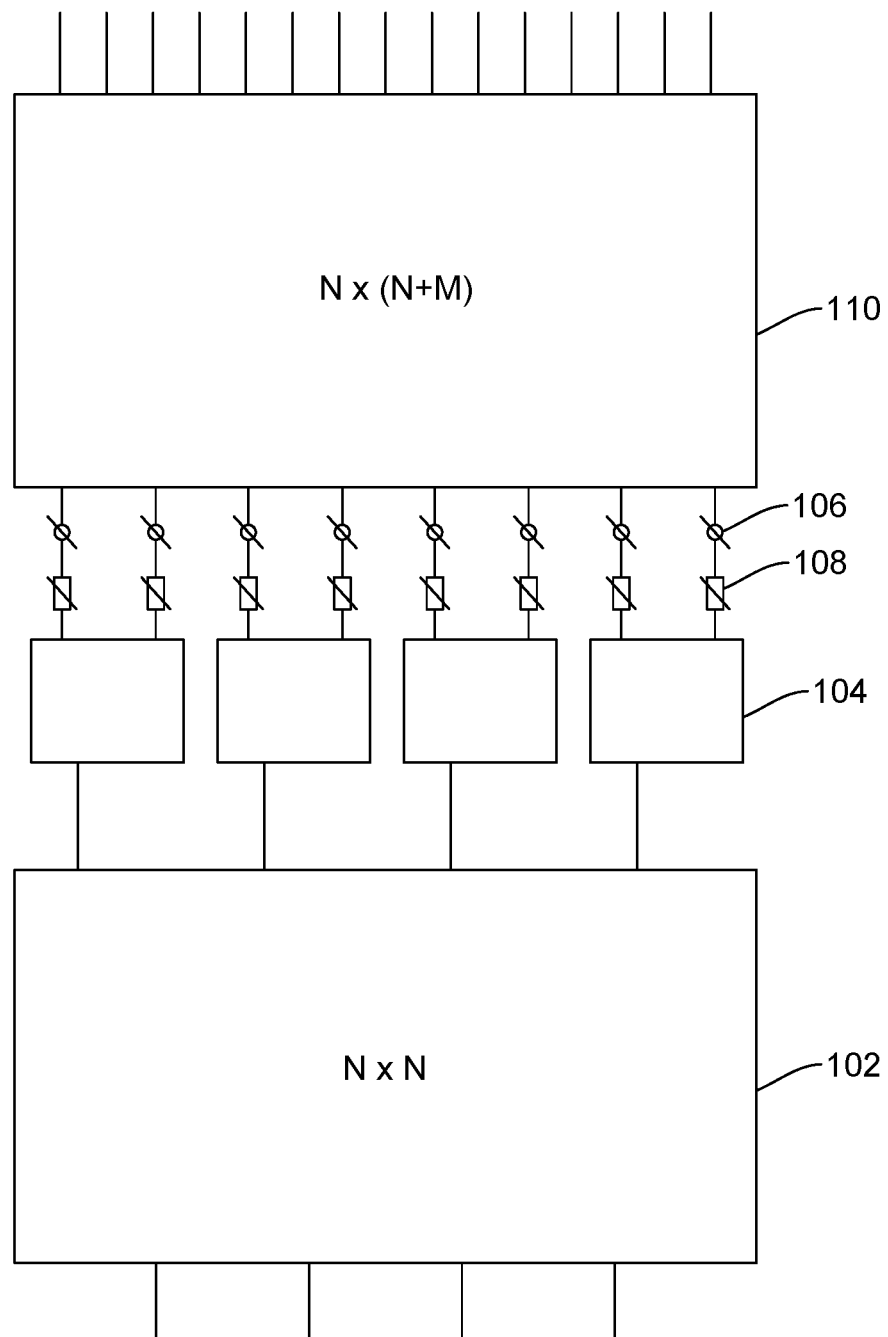
FIG. 9 shows another embodiment, in which an N×N beam forming network is connected to a N×(N+M) beam forming network using one or more variable phase shifters, fixed phase shifters, and 90 degree hybrid couplers.

FIG. 9 shows another embodiment of the disclosed subject matter, in which an N×N beam forming network 102 is operatively coupled to a N×(N+M) beam forming network 110, using one or more variable phase shifters 106, fixed phase shifters 108, and 90 degree hybrid couplers 104. M can be any integer greater than or equal to two (2). M can also be equal to one (1), which results in a retro-directive antenna.

In accordance with one or more of the disclosed embodiments, signals are able to be received from one direction and transmitted in a different direction. In addition, one or more techniques described in U.S. Pat. No. 8,170,634 may be implemented between beam forming networks in accordance with the disclosed subject matter to reduce sidelobe levels and provide power dividers with power division having various phase variations. Further, embodiments in accordance with the disclosed subject matter utilize amplitude modes as well as phase modes, wherein amplitude and/or phase is controlled and/or tapered for sidelobe reduction in azimuth and/or elevation. Yet further, it is to be noted that utilizing power division, unequal power, and/or various phases of M outputs connected to an MN×MN beam forming network enables the antenna pattern of an antenna array to yield increased gain, reduced beam width, reduced sidelobe levels, and the selection of beam crossing width to increase the signal-to-noise ratio. In accordance with one or more embodiments disclosed herein, it is to be noted that there is no constraint regarding multiple beam forming networks being required to be of the same order, type, and/or quantity of input and/or output connections, such as a requirement that both beam forming networks be 8×8 or 16×16, as shown in, for example, in FIG. 2.

FIG. 9 shows another embodiment of the disclosed subject matter, in which an N×N beam forming network 102 is operatively coupled to a N×(N+M) beam forming network 110, in which M=7, using one or more variable phase shifters 106, fixed phase shifters 108, and/or 90 degree hybrid couplers 104. M can be any integer greater than or equal to one (1). This embodiment provides beam crossovers at different values and reduces sidelobe levels, which results in a substantially improved signal-to-noise ratio that is advantageous in 5G communication applications.

Figure 10:
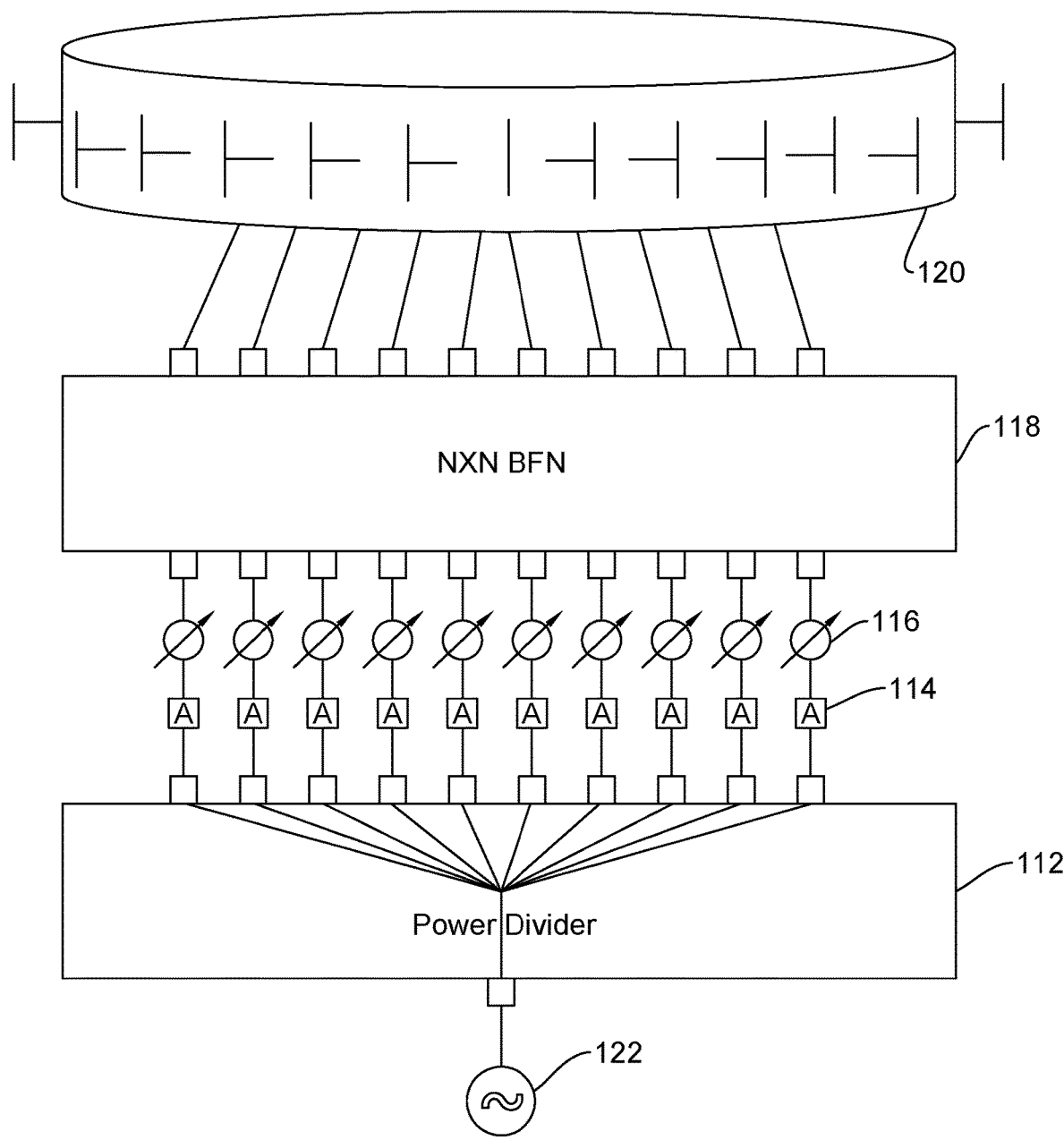
FIG. 10 shows another embodiment including a circular antenna array, N×N beam forming network, variable phase shifters, attenuators, power divider, and signal transceiver.

FIG. 10 shows a circular antenna array 120, an N×N beam forming network 118, variable phase shifters 116, attenuators 114, a power divider 112, and a signal transceiver 122. The circular antenna array 120 is operatively coupled to output ports of the N×N beam forming network 118. Each input port of the N×N beam forming network 118 is operatively coupled to an output port of the power divider 112 through one or more variable phase shifters 116 and/or attenuators 114. The power divider 112 is operatively coupled to the signal transceiver 122. In this embodiment, amplitude tapering is performed using the variable phase shifters 116 and/or attenuators 114 for sidelobe reduction in azimuth. It is to be noted that if the circular antenna array is configured vertically rather than horizontally with similar amplitude tapering, then sidelobe reduction occurs in elevation. Crossings of beams are in the region of −3 dB.

Figure 11:
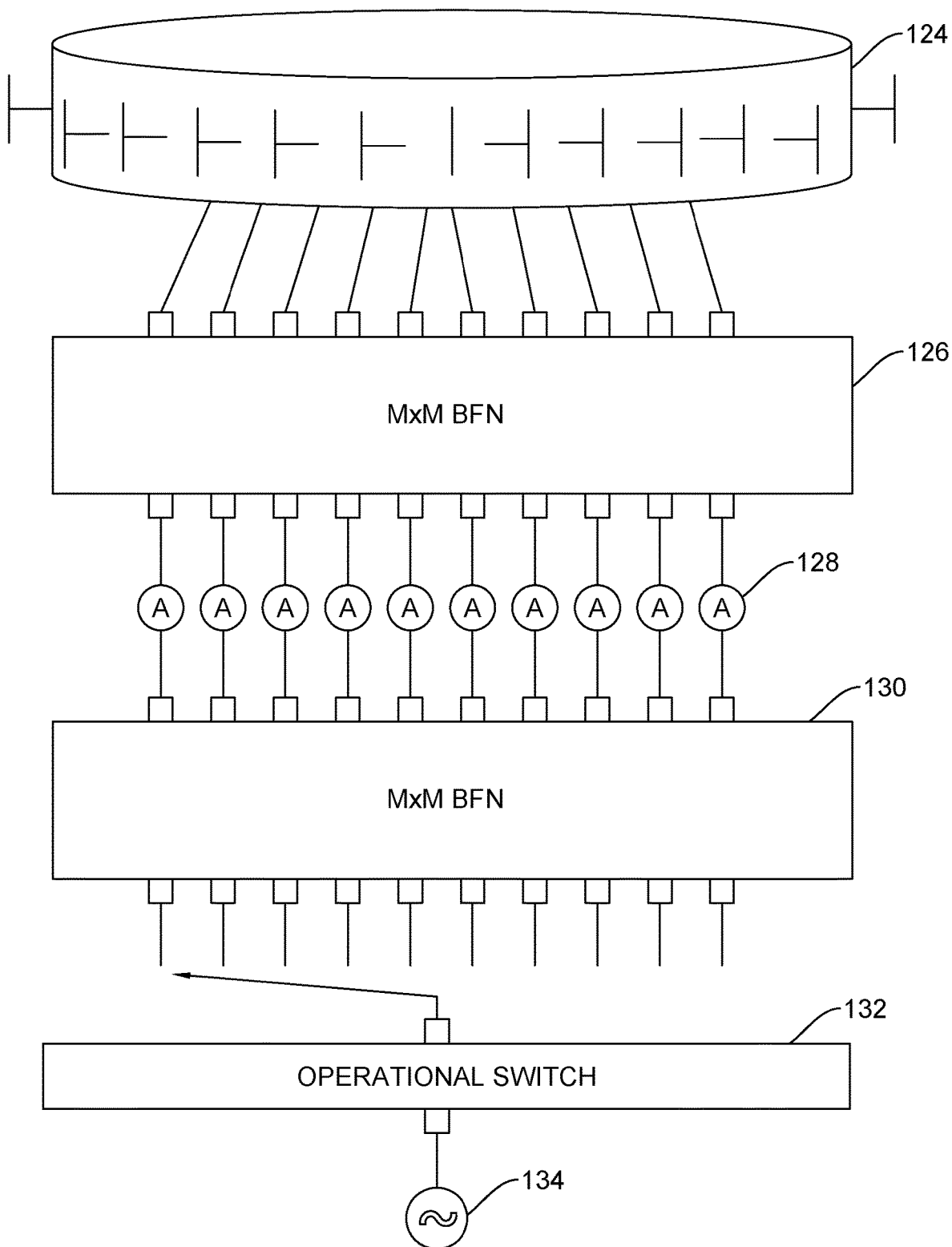
FIG. 11 shows another embodiment including a circular antenna array, first M×M beam forming network, attenuators, second M×M beam forming network, operational switch, and signal transceiver.

FIG. 11 shows a circular antenna array 124, a first M×M beam forming network 126, attenuators 128, a second M×M beam forming network 130, an operational switch 132, and a signal transceiver 134. The circular antenna array 124 is operatively coupled to output ports of the first M×M beam forming network 126. Each input port of the first M×M beam forming network 126 is operatively coupled to an output port of the second M×M beam forming network 130 through one or more attenuators 128. Each input port of the second M×M beam forming network 130 is selectively coupled to the operational switch 132. The operational switch 132 can be an analog or a digital switch that selectively directs one or more signals to produce a beam in a certain location of 360°, depending on which input of the second M×M beam forming network 130 the signal 134 is directed to by the operational switch 134. By sweeping through the positions of the switch 132, the beam can be swept to cover 360°. In this embodiment, amplitude tapering for sidelobe reduction is performed in either azimuth or elevation using the attenuators 128, depending upon whether the antenna array is configured horizontally or vertically. Crossings of beams are in the region of −3 dB.

Figure 12:
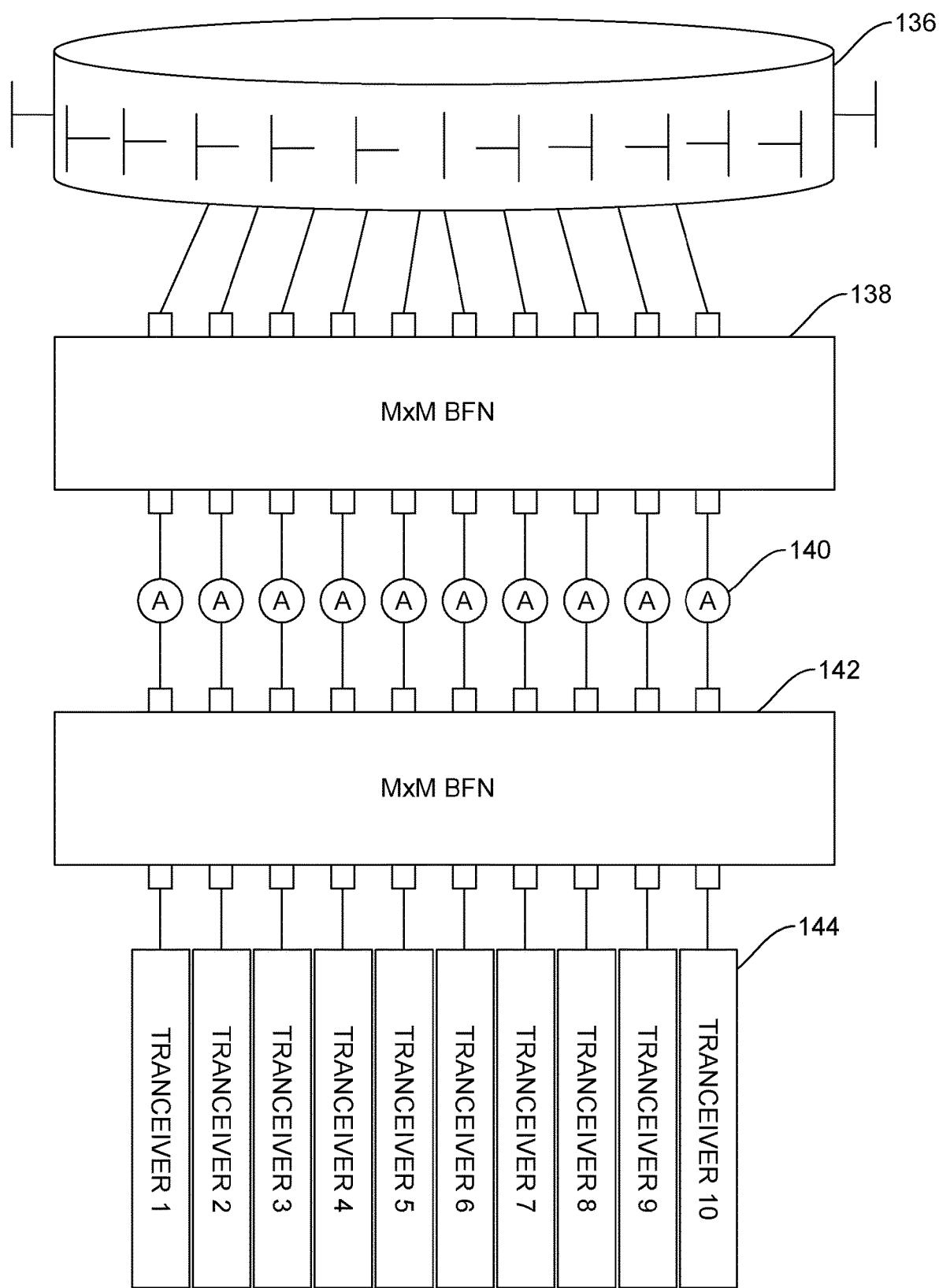
FIG. 12 shows another embodiment including a circular antenna array, first M×M beam forming network, attenuators, second M×M beam forming network, and independent signal transceivers.

FIG. 12 shows a circular antenna array 136, a first M×M beam forming network 138, attenuators 140, a second M×M beam forming network 142, and independent signal transceivers 144. The circular antenna array 136 is operatively coupled to the first M×M beam forming network 138, which is operatively coupled to a second M×M beam forming network 142 using one or more of the attenuators 140. The attenuators 40 are operatively coupled to the independent signal transceivers 144. The second beam forming network 142 is configurable to provide an antenna beam every 36°, that is, at 0°, 36°, 72°, and the like. If each of the input ports of the second beam forming network 142 is connected to a transceiver 144, as shown in FIG. 12, transmission can occur simultaneously or sequentially over a 360° area. In this embodiment, amplitude tapering can be performed for sidelobe reduction in either azimuth and/or elevation using the attenuators 140, depending upon whether the circular array is configured horizontally or vertically. Crossings of beams are in the region of −3 dB.

Figure 13:
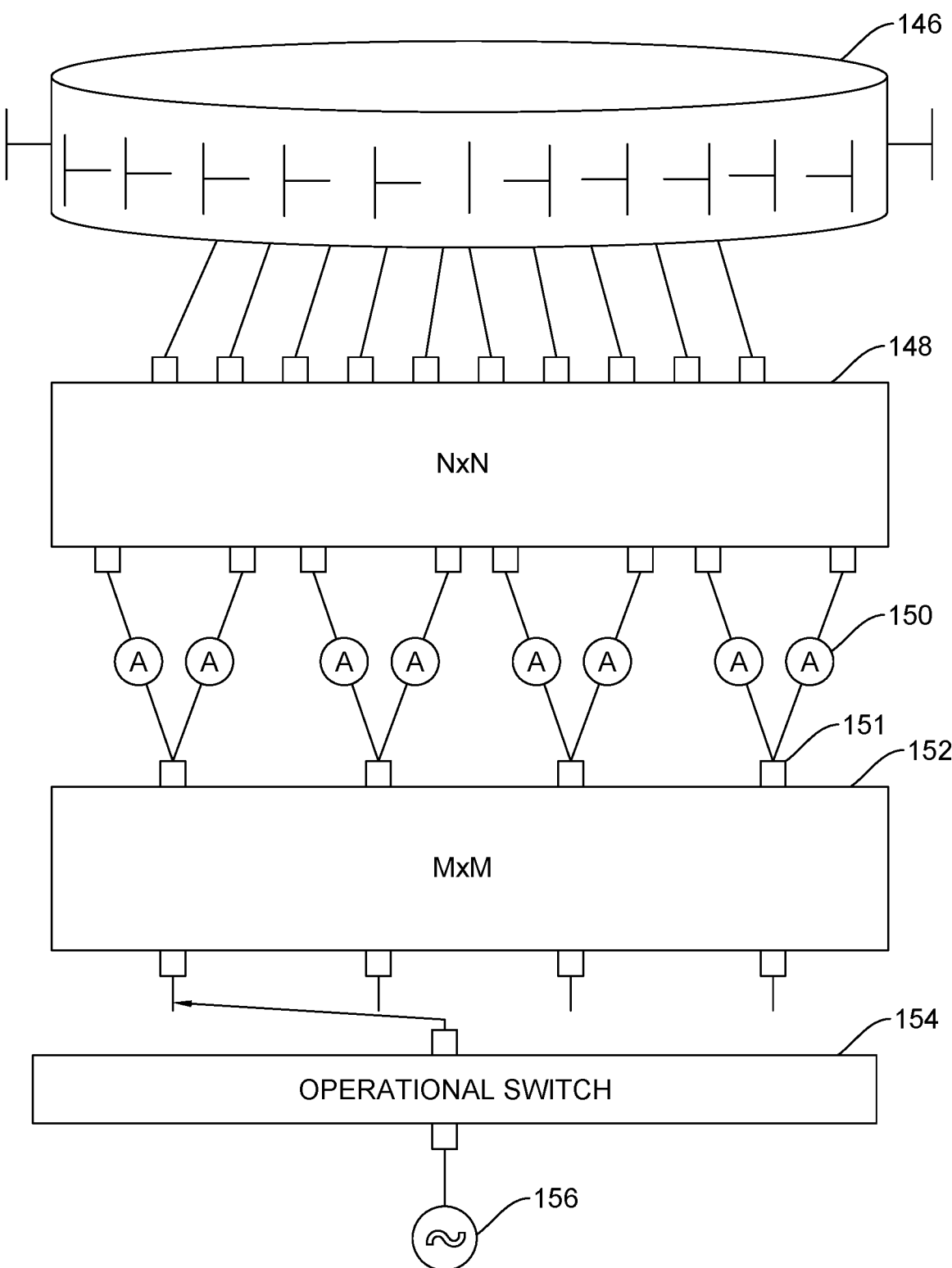
FIG. 13 shows another embodiment including a circular antenna array, N×N beam forming network, attenuators, hybrid couplers, power dividers, and/or phase shifters, M×M beam forming network, operational switch, and signal transceiver.

FIG. 13 shows a circular antenna array 146, an N×N beam forming network 148, attenuators 150, hybrid couplers, power dividers, and/or phase shifters 151, an M×M beam forming network 152, an operational switch 154, and a signal transceiver 156. The circular antenna array 146 is operatively coupled to the N×N beam forming network 148, which is operatively coupled to the M×M beam forming network 152 using one or more attenuators 150, hybrid couplers, power dividers, and/or phase shifters 151. The M×M beam forming network 152 is selectively coupled to the operational switch 154, which is operatively coupled to the signal transceiver 156. In this embodiment, amplitude tapering for sidelobe reduction is performed in either azimuth or elevation using the attenuators 150, hybrid couplers, power dividers, and/or phase shifters 151, depending upon whether the antenna array is configured horizontally or vertically. Crossings of beams may be configured using the attenuators 150, hybrid couplers, power dividers, and/or phase shifters 151, which also control the beam widths, at any level, such as for example −10 dB.

Figure 14:
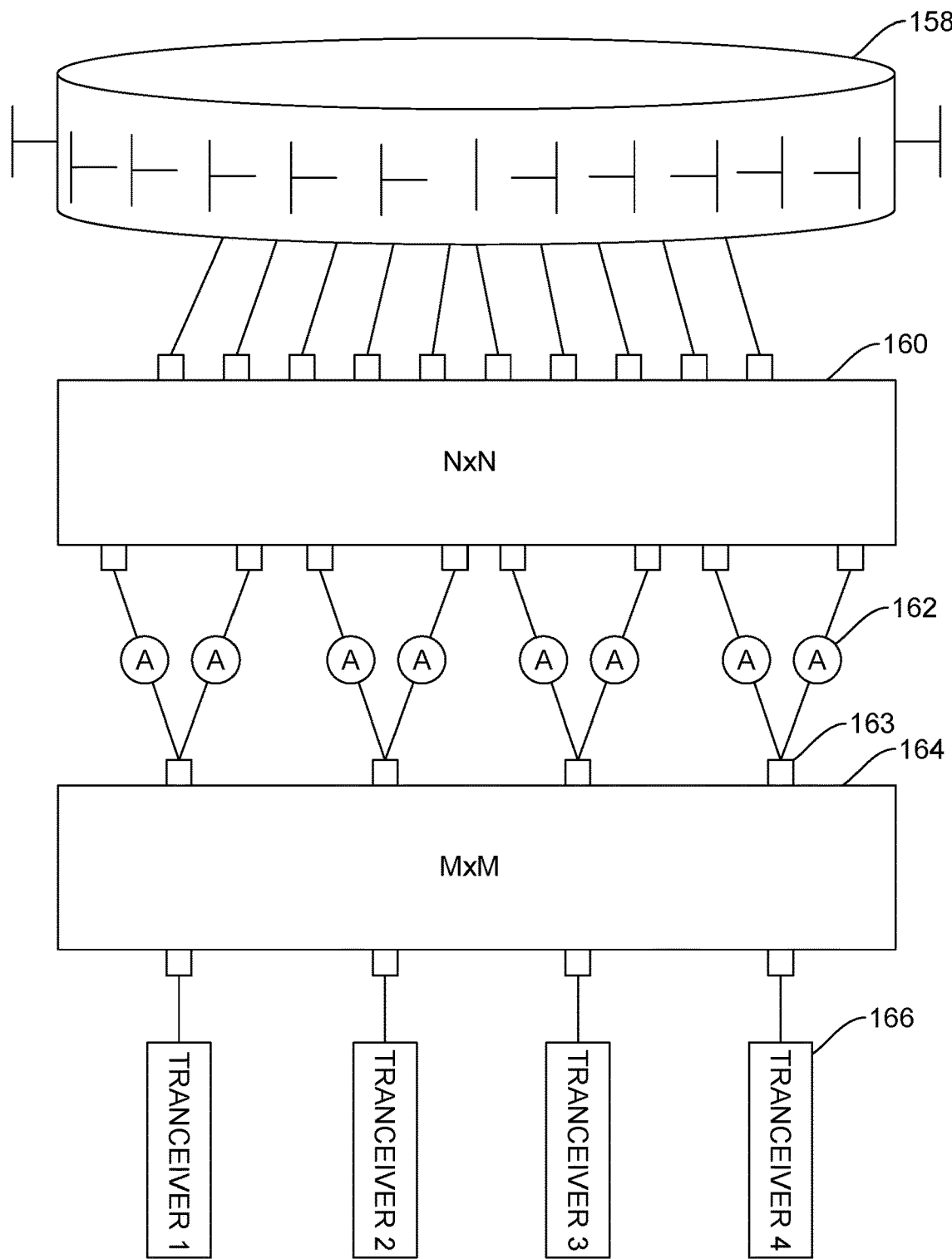
FIG. 14 shows another embodiment including a circular antenna array, N×N beam forming network, attenuators, hybrid couplers, power dividers, and/or phase shifters, M×M beam forming network, and signal transceivers.

FIG. 14 shows a circular antenna array 158, an N×N beam forming network 160, attenuators 162, hybrid couplers, power dividers, and/or phase shifters 163, an M×M beam forming network 164, and signal transceivers 166. The circular antenna array 158 is operatively coupled to the N×N beam forming network 160, which is operatively coupled to the M×M beam forming network 164 using one or more attenuators 162, hybrid couplers, power dividers, and/or phase shifters 163. The M×M beam forming network 164 is operatively coupled to the one or more of the signal transceivers 166. In this embodiment, amplitude tapering for sidelobe reduction is performed in either azimuth or elevation using the attenuators 162, hybrid couplers, power dividers, and/or phase shifters 163, depending upon whether the antenna array is configured horizontally or vertically. Crossings of beams may be configured using the , attenuators 162, hybrid couplers, power dividers, and/or phase shifters 163, which also control the beam widths, at any level, such as for example −10 dB.

Figure 15:
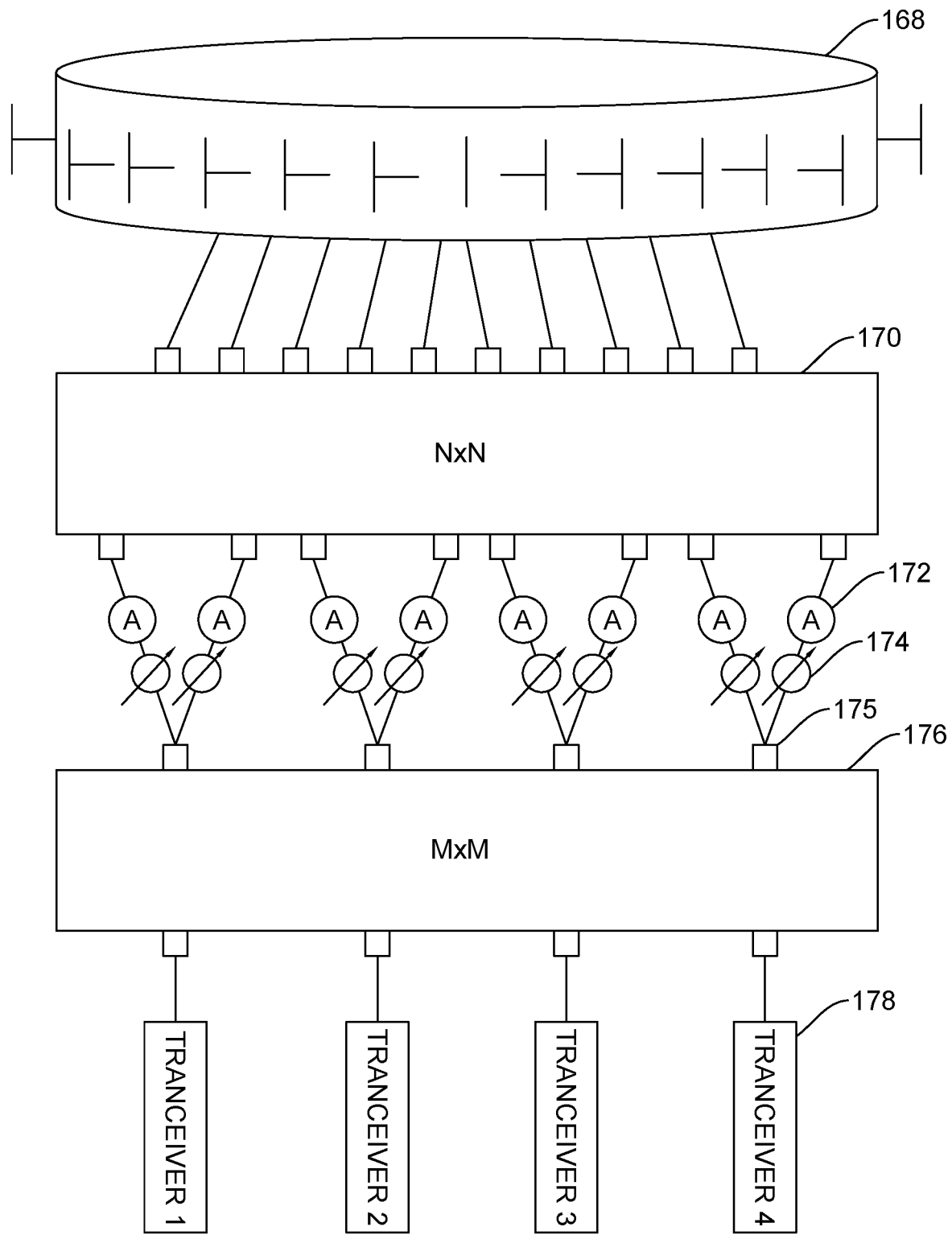
FIG. 15 shows another embodiment including a circular antenna array, N×N beam forming network, attenuators, phase shifters, and/or power dividers, M×M beam forming network, and signal transceivers.

FIG. 15 shows a circular antenna array 168, an N×N beam forming network 170, attenuators 172, phase shifters 174, and/or power dividers 175, an M×M beam forming network 176, and signal transceivers 178. The circular antenna array 168 is operatively coupled to the N×N beam forming network 170, which is operatively coupled to the M×M beam forming network 176 using one or more attenuators 172, phase shifters 174, and/or power dividers 175. The M×M beam forming network 176 is operatively coupled to one or more of the signal transceivers 178. In this embodiment, amplitude tapering for sidelobe reduction is performed in either azimuth or elevation using the attenuators 172, phase shifters 174, and/or power dividers 175, depending upon whether the antenna array is configured horizontally or vertically. Crossings of beams may be configured using the attenuators 172, phase shifters 174, and/or power dividers 175, which also control the beam widths, at any level, such as for example −10 dB.

Figure 16:
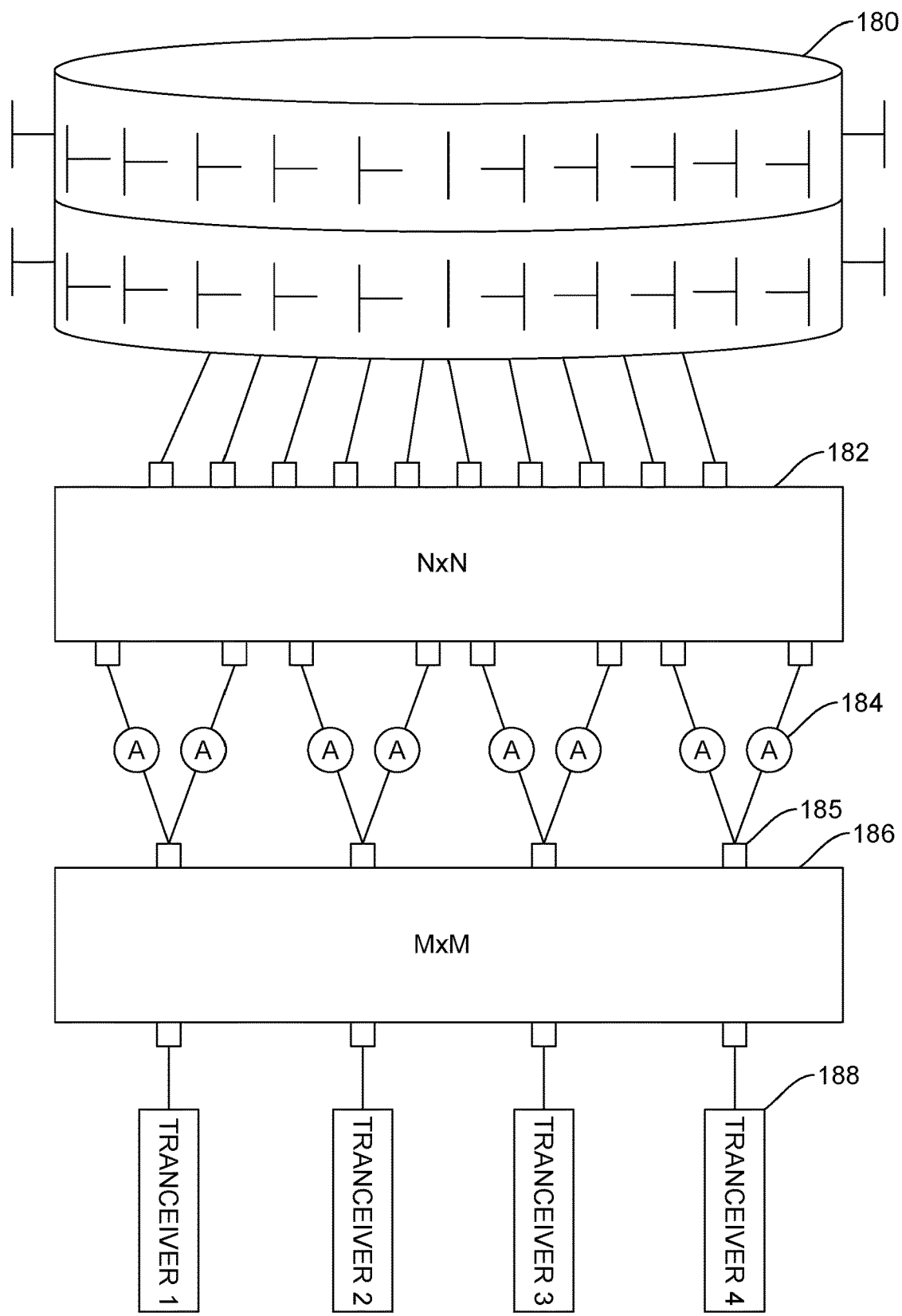
FIG. 16 shows another embodiment including a cylindrical antenna array, N×N beam forming network, attenuators, hybrid couplers, power dividers, and/or phase shifters, M×M beam forming network, and signal transceivers.

FIG. 16 shows a cylindrical antenna array 180, an N×N beam forming network 182, attenuators 184, hybrid couplers, power dividers, and/or phase shifters 185, an M×M beam forming network 186, and signal transceivers 188. The cylindrical antenna array 180 is operatively coupled to the N×N beam forming network 182, which is operatively coupled to the M×M beam forming network 186 using one or more of the attenuators 184, hybrid couplers, power dividers, and/or phase shifters 185. The M×M beam forming network 186 is operatively coupled to the one or more of the signal transceivers 188. In this embodiment, amplitude tapering for sidelobe reduction is performed in either azimuth or elevation using the attenuators 184, hybrid couplers, power dividers, and/or phase shifters 185, depending upon whether the antenna array is configured horizontally or vertically. Crossings of beams may be configured using the attenuators 184, hybrid couplers, power dividers, and/or phase shifters 185, which also control the beam widths, at any level, such as for example −10 dB.

Figure 17:
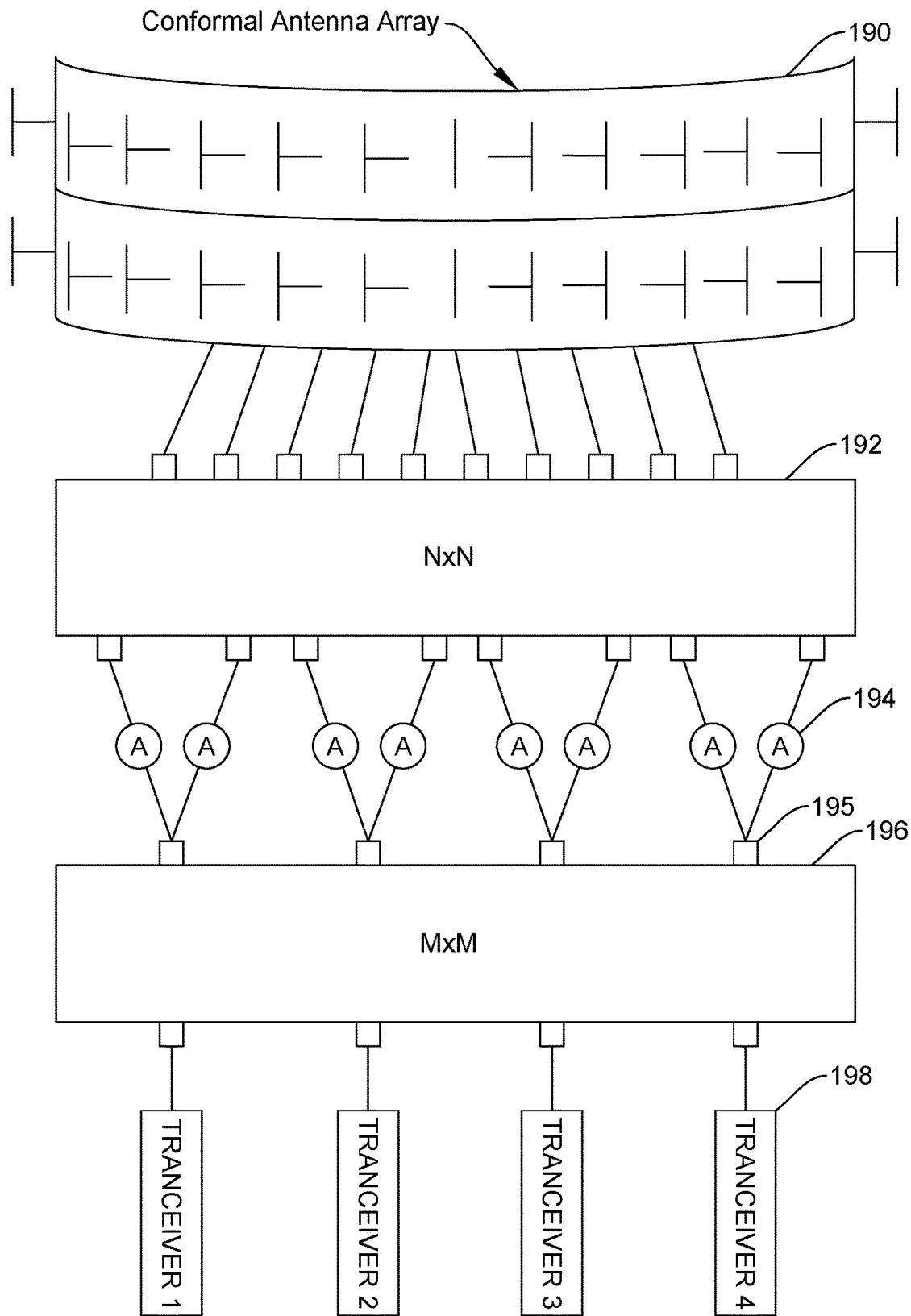
FIG. 17 shows another embodiment including a conformal array in a single portion of a curvilinear array or in a single portion of a surface conformal array, N×N beam forming network, attenuators, hybrid couplers, power dividers, and/or phase shifters, M×M beam forming network, and signal transceivers.

FIG. 17 shows a conformal array as a single portion of a curvilinear array or as a single portion of a surface conformal array 190, an N×N beam forming network 192, attenuators 194, hybrid couplers, power dividers, and/or phase shifters 195, an M×M beam forming network 196, and signal transceivers 198. The conformal array 190 is operatively coupled to the N×N beam forming network 192, which is operatively coupled to the M×M beam forming network 196 using one or more of the attenuators 194, hybrid couplers, power dividers, and/or phase shifters 195. The M×M beam forming network 196 is operatively coupled to one or more of the signal transceivers 198. In this embodiment, amplitude tapering for sidelobe reduction is performed in either azimuth or elevation using the attenuators 194, hybrid couplers, power dividers, and/or phase shifters 195, depending upon whether the antenna array is configured horizontally or vertically. Crossings of beams may be configured using the attenuators 194, hybrid couplers, power dividers, and/or phase shifters 195, which also control the beam widths, at any level, such as for example −10 dB.

Figure 18:
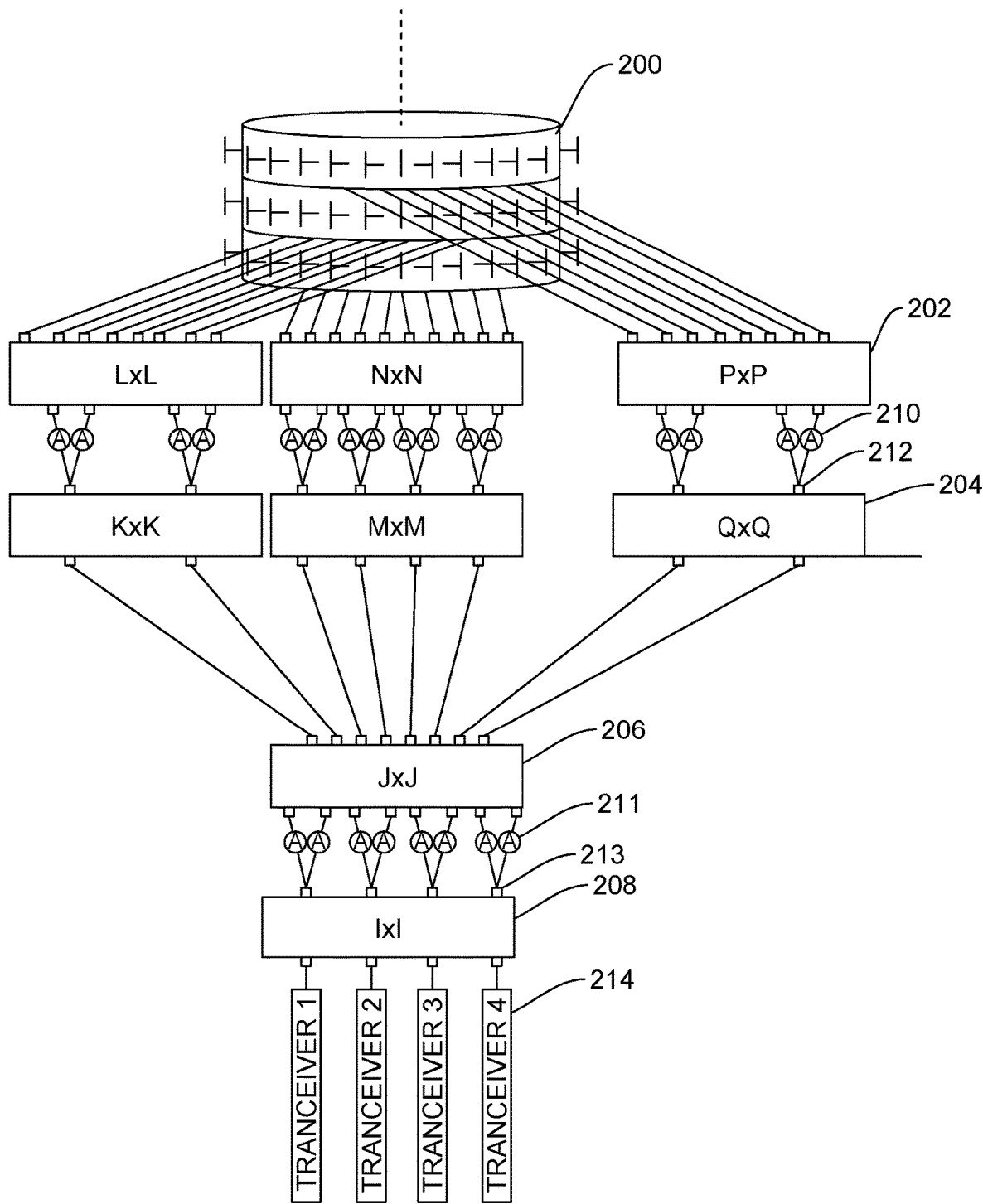
FIG. 18 shows another embodiment including a plurality of cylindrical arrays, beam forming networks, attenuators, hybrid couplers, power dividers, and/or phase shifters, and signal transceivers.

FIG. 18 shows a plurality of cylindrical arrays 200, a plurality of beam forming network stages 202, 204, 206, 208, which are connected using attenuators 210, 211, 224, hybrid couplers, power dividers, and/or phase shifters 212, 213, and signal transceivers 214. The cylindrical arrays 200 are operatively coupled to a first stage of beam forming networks 202, which are operatively coupled to a second stage of beam forming networks 204 using one or more attenuators 210, hybrid couplers, power dividers, and/or phase shifters 212. The second stage of beam forming networks 204 are operatively coupled to one or more third stage beam forming network 206, which is operatively coupled to one or more fourth stage beam forming network 208 using one or more of the attenuators 211, hybrid couplers, power dividers, and/or phase shifters 213. One or more fourth stage beam forming network 208 is operatively coupled to one or more of the signal transceivers 214. In this embodiment, amplitude tapering for sidelobe reduction is performed using the attenuators 210, 211, hybrid couplers, power dividers, and/or phase shifters 212, 213 in azimuth and/or elevation. Crossings of beams in azimuth and/or elevation may also be configured using the attenuators 210, 211, hybrid couplers, power dividers, and/or phase shifters 212, 213, which also control the beam widths, at any level, such as for example −10 dB.

Figure 19:
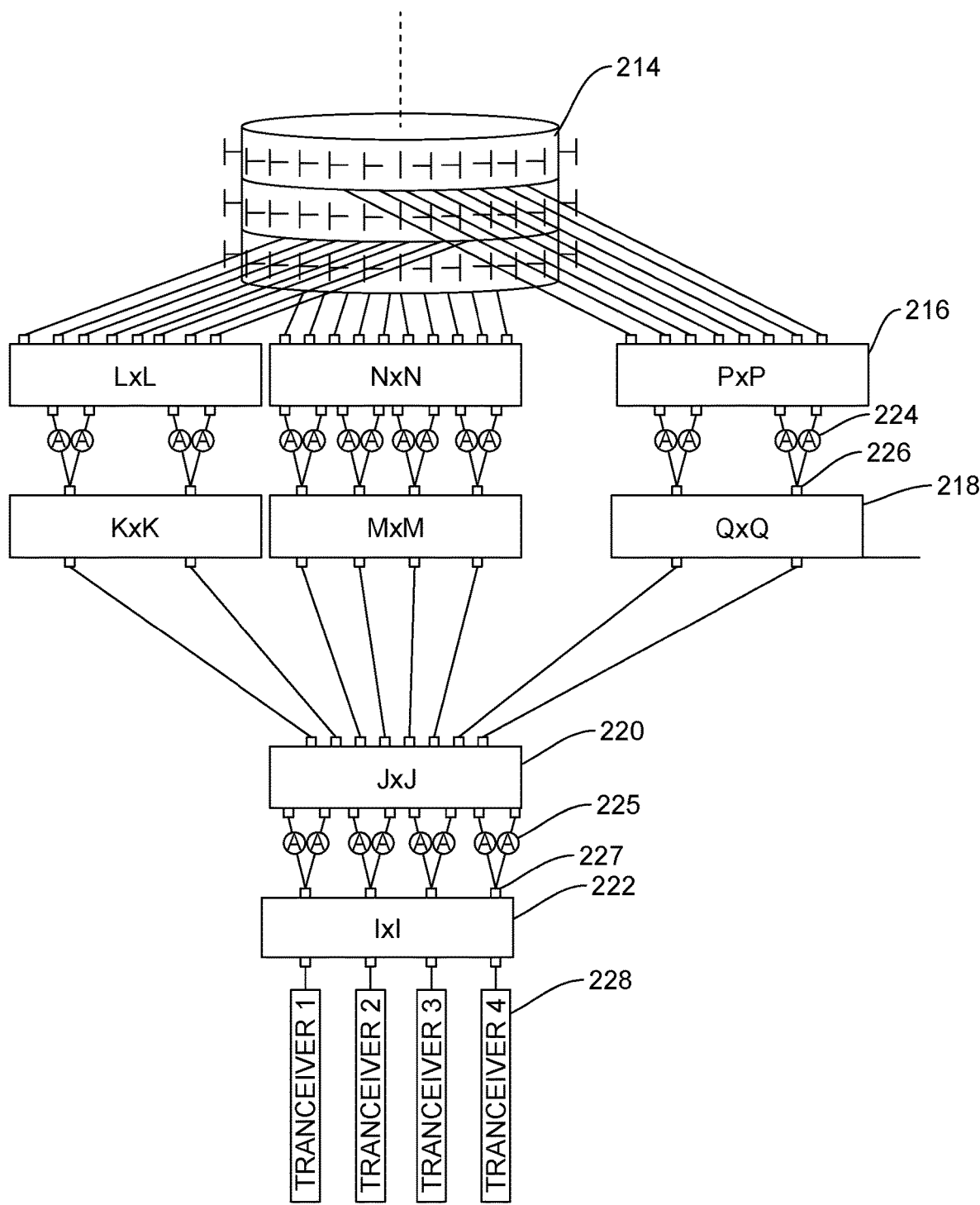
FIG. 19 shows another embodiment including a plurality of conformal arrays, beam forming networks, attenuators, hybrid couplers, power dividers, and/or phase shifters, and signal transceivers.

FIG. 19 shows a plurality of conformal arrays 214, a plurality of beam forming network stages 216, 218, 220, 222, which are connected using attenuators 224, 225, hybrid couplers, power dividers, and/or phase shifters 226, 227, and a signal transceivers 228. The conformal arrays 214 are operatively coupled to a first stage of beam forming networks 216, which are operatively coupled to a second stage of beam forming networks 218 using one or more attenuators 224, hybrid couplers, power dividers, and/or phase shifters 222612. The second stage of beam forming networks 218 are operatively coupled to one or more third stage beam forming network 220, which is operatively coupled to one or more fourth stage beam forming network 222 using one or more of the attenuators 225, hybrid couplers, power dividers, and/or phase shifters 227. One or more fourth stage beam forming network 222 is operatively coupled to one or more of the signal transceivers 228. In this embodiment, amplitude tapering for sidelobe reduction using the attenuators 224, 235, hybrid couplers, power dividers, and/or phase shifters 226, 227 is performed in both azimuth and/or elevation. Crossings of beams in azimuth and/or elevation may also be configured using the attenuators 224, 225, hybrid couplers, power dividers, and/or phase shifters 226, 227, which also control the beam widths, at any level, such as for example −10 dB.

In accordance with one embodiment, an antenna array system that provides simultaneous transmission and/or reception with up to 360° coverage is disclosed, which includes Butler matrix beam forming networks connected together to an antenna array, which includes narrow and/or broadband elements, and multiple transmitters, receivers, or transceivers to allow for 360° transmission and/or reception. The antenna array system provides multiple beams, such as without limitation 8 or 16 beams, which can vary in beam crossing and/or overlap to provide simultaneous coverage of up to 360°.

In accordance with another embodiment, an antenna array system is provided, which includes a plurality of antenna elements configured in an array, a first Butler matrix operatively coupled to the plurality of antenna elements, and a second Butler matrix operatively coupled to the first Butler matrix.

The first Butler matrix may include a plurality of output ports and a plurality of input ports. Each of the plurality of output ports associated with the first Butler matrix may be operatively coupled to each of the plurality of antenna elements, and each of the plurality of input ports associated with the first Butler matrix may be coupled to each of a plurality of output ports associated with the second Butler matrix. The second Butler matrix may include a plurality of output ports and a plurality of input ports. Each of the plurality of output ports associated with the second Butler matrix may be operatively coupled to each of a plurality of input ports associated with the first Butler matrix, and each of the plurality of input ports associated with the second Butler matrix may be coupled to a transceiver. The antenna array system may include a switch, which can have one or multiple outputs and inputs. The second Butler matrix may include a plurality of output ports and a plurality of input ports. Each of the plurality of output ports associated with the second Butler matrix may be operatively coupled to each of a plurality of input ports associated with the first Butler matrix, each of the plurality of input ports associated with the second Butler matrix may be coupled to the output of the switch, and the input of switch may be coupled to a transceiver. The plurality of antenna elements may be configured to provide 360° coverage in response to the switch being swept through a plurality of positions. At least one of the plurality of antenna elements may include at least one of a bow tie antenna, log periodic antenna, and Vivaldi antenna. The plurality of antenna elements may be configured in at least one of a circle, cylinder semi-circle, arc, line, sphere, and/or any conformal shaped array.

In accordance with another embodiment, a method of providing simultaneous 360° coverage is provided, which includes configuring a plurality of antenna elements in an array, coupling a first Butler matrix operatively to the plurality of antenna elements, and coupling a second Butler matrix operatively to the first Butler matrix.

The method may also include coupling each of a plurality of output ports associated with the first Butler matrix operatively to each of the plurality of antenna elements, and coupling each of a plurality of input ports associated with the first Butler matrix to each of a plurality of output ports associated with the second Butler matrix. The method may include coupling each of a plurality of output ports associated with the second Butler matrix operatively to each of a plurality of input ports associated with the first Butler matrix, and coupling each of a plurality of input ports associated with the second Butler matrix to a transceiver. The method may include coupling each of a plurality of output ports associated with the second Butler matrix operatively to each of a plurality of input ports associated with the first Butler matrix, coupling each of a plurality of input ports associated with the second Butler matrix to the output of a switch, and coupling the input of switch operatively to a transceiver. The method may include configuring the plurality of antenna elements to provide 360° coverage in response to the switch being swept through a plurality of positions. At least one of the plurality of antenna elements may include at least one of a bow tie antenna, log periodic antenna, and Vivaldi antenna. The method, configuring the plurality of antenna elements as at least one of a circle, semi-circle, arc, line, sphere, and/or any conformal shape.

In accordance with another embodiment, an antenna array system is provided, which includes a plurality of antenna elements configured in an array, a first beam forming network operatively coupled to the plurality of antenna elements, a second beam forming network operatively coupled to the first beam forming network, and a switch. The switch includes an output and an input, and the second beam forming network includes a plurality of output ports and a plurality of input ports. Each of the plurality of output ports associated with the second beam forming network is operatively coupled to one of a plurality of input ports associated with the first beam forming network. The switch sequentially couples each of the plurality of input ports associated with the second beam forming network to a signal from a transceiver by sweeping the switch through a plurality of positions, thereby enabling the antenna to provide sequential 360° coverage.

The first beam forming network may be a K×N beam forming network, in which K is greater than or equal to N. The second beam forming network may be an N×M beam forming network, in which M is less than or equal to N. At least one of the first and second beam forming networks may include at least one of a Butler matrix, Blass matrix, Nolen matrix, Shelton matrix, and/or Davis matrix.

In accordance with another embodiment, a method of providing simultaneous 360° coverage using a multi-beam antenna array is provided, which includes configuring a plurality of antenna elements in an array, coupling a first beam forming network operatively to the plurality of antenna elements, coupling a second beam forming network operatively to the first beam forming network, coupling each of a plurality of output ports associated with the second beam forming network operatively to one of a plurality of input ports associated with the first beam forming network, coupling sequentially each of a plurality of input ports associated with the second beam forming network to a signal from a transceiver by sweeping a switch through a plurality of positions, thereby enabling the antenna to provide sequential 360° coverage.

The first beam forming network may be a K×N beam forming network, in which K is greater than or equal to N. The second beam forming network may be a N×M beam forming network, in which M is less than or equal to N. At least one of the first and second beam forming networks may include at least one of a Butler matrix, Blass matrix, Nolen matrix, Shelton matrix, McFarland matrix, and/or Davis matrix.

Although the specification describes components and functions implemented in the embodiments with reference to particular standards and protocols, the embodiment are not limited to such standards and protocols. It is to be understood that the various references throughout this disclosure made to input and output ports are not intended as a limitation on the direction of energy passing through these ports since, by the Reciprocity Theorem, energy is able to pass in either direction. Rather these references are merely intended as a convenient method of referring to various portions of the disclosed embodiments.

The illustrations of embodiments described herein are intended to provide a general understanding of the structure of various embodiments, and are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments of the inventive subject matter are referred to herein, individually and/or collectively, by the term "embodiment" merely for convenience and without intending to limit the scope of this application to any single embodiment or inventive concept. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. A beam forming network system, which comprises:
a first beam forming network comprising a plurality of first ports and a plurality of second ports, each of the plurality of first ports configured to be operatively coupled to one of a plurality of antenna elements of a circular array antenna;

a second beam forming network comprising a plurality of third ports and a plurality of fourth ports, each of the plurality of third ports being operatively coupled to one of the plurality of second ports using a four-port hybrid coupler; and a switch being configured for:

sequentially coupling each of the plurality of fourth ports to a signal by sweeping the switch through a plurality of positions, thereby enabling the plurality of antenna elements to provide sequential 360° coverage in a first operation;

simultaneously coupling each of the plurality of fourth ports to the signal to enable the plurality of antenna elements to provide simultaneous 360° coverage in a second operation; and selectively coupling a portion of the plurality of fourth ports to the signal to enable the plurality of antenna elements to provide a partial 360° coverage in a third operation;

the beam forming network system being configured to perform amplitude tapering for sidelobe reduction in either azimuth or elevation using the four-port hybrid coupler;

a quantity of the plurality of fourth ports being less than a quantity of the plurality of first ports; and the beam forming network system being configured to enable selection of beam crossing width such that a signal-to-noise ratio is increased.

2. The beam forming network system, as defined by claim 1, wherein the first beam forming network is a K×N beam forming network, K being greater than or equal to N.

3. The beam forming network system, as defined by claim 1, wherein the second beam forming network is an N×M beam forming network, M being less than or equal to N.

4. The beam forming network system, as defined by claim 1, wherein at least one of the first beam forming network and the second beam forming network comprises at least one of a Butler matrix, a Blass matrix, a Nolen matrix, a Shelton matrix, a McFarland matrix, or a Davis matrix.

5. A method of beam forming, the method comprising:

coupling each of a plurality of first ports associated with a first beam forming network operatively to one of a plurality of antenna elements of a circular array antenna;

coupling each of a plurality of third ports associated with a second beam forming network operatively to one of a plurality of second ports associated with the first beam forming network using a four-port hybrid coupler;

coupling each of a plurality of fourth ports associated with the second beam forming network sequentially to a signal by sweeping a switch through a plurality of positions, thereby enabling the antenna elements to provide sequential 360° coverage in a first operation;

coupling each of the plurality of fourth ports simultaneously to the signal to enable the plurality of antenna elements to provide simultaneous 360° coverage in a second operation;

selectively coupling a portion of the plurality of fourth ports to the signal to enable the plurality of antenna elements to provide a partial 360° coverage in a third operation, a quantity of the plurality of fourth ports being less than a quantity of the plurality of first ports;

performing amplitude tapering for sidelobe reduction in either azimuth or elevation using the four-port hybrid coupler; and enabling selection of beam crossing width such that a signal-to-noise ratio is increased.

6. The method of beam forming, as defined by claim 5, wherein the first beam forming network is a K×N beam forming network, K being greater than or equal to N.

7. The method of beam forming, as defined by claim 5, wherein the second beam forming network is an N×M beam forming network, M being less than or equal to N.

8. The method of beam forming, as defined by claim 5, wherein at least one of the first beam forming network and the second beam forming network comprises at least one of a Butler matrix, a Blass matrix, a Nolen matrix, a Shelton matrix, a McFarland matrix, or Davis matrix.

9. A beam forming network system, which comprises:

at least one first beam forming network comprising a plurality of first ports and a plurality of second ports, each of the plurality of first ports configured to be operatively coupled to one of a plurality of antenna elements of a circular array antenna; and at least one second beam forming network comprising a plurality of third ports and a plurality of fourth ports, each of the plurality of third ports being operatively coupled to one of the plurality of second ports using a first four-port hybrid coupler;

a switch being configured to:

sequentially couple each of the plurality of fourth ports to a signal by sweeping the switch through a plurality of positions, thereby enabling the plurality of antenna elements to provide sequential 360° coverage in a first operation;

simultaneously couple each of the plurality of fourth ports to the signal to provide simultaneous 360° coverage in a second operation; and selectively couple a portion of the plurality of fourth ports to the signal to provide a partial 360° coverage in a third operation;

the beam forming network system being configured to perform amplitude tapering for sidelobe reduction in either azimuth or elevation using the first four-port hybrid coupler;

a quantity of the plurality of fourth ports being less than a quantity of the plurality of first ports; and the beam forming network system being configured to enable selection of beam crossing width such that a signal-to-noise ratio is increased; and at least one third beam forming network comprising a plurality of fifth ports and a plurality of sixth ports, the plurality of fifth ports configured to be operatively coupled to a one of the plurality of fourth ports.

10. The beam forming network system, as defined by claim 9, wherein the first beam forming network is an MN×MN beam forming network, N being an integer greater than or equal to one (1), M being an integer greater than or equal to one (1).

11. The beam forming network system, as defined by claim 9, wherein the second beam forming network is an N×N beam forming network, N being an integer greater than or equal to one (1).

12. The beam forming network system, as defined by claim 9, wherein the first beam forming network is an N×(N+M) beam forming network, N being an integer greater than or equal to one (1), M being an integer greater than or equal to one (1).

13. The beam forming network system, as defined by claim 9, wherein at least one of the first beam forming network and the second beam forming network comprises at least one of a Butler matrix, a Blass matrix, a Nolen matrix, a Shelton matrix, a McFarland matrix, or a Davis matrix.

14. The beam forming network system, as defined by claim 9, wherein the first four-port hybrid coupler comprises at least one of a 90 degree hybrid coupler or a 180 degree hybrid coupler.

15. The beam forming network system, as defined by claim 9, wherein at least one of amplitude or phase is controlled for sidelobe reduction in at least one of azimuth or elevation using at least one of a first variable phase shifter, a first fixed phase shifter, a first attenuator, a first power divider, or the first four-port hybrid coupler.

16. The beam forming network system, as defined by claim 9, wherein the first beam forming network is an N×N beam forming network, N being an integer greater than or equal to one (1).

17. The beam forming network system, as defined by claim 9, wherein each of the plurality of fourth ports is configured to be operatively coupled to one of a plurality of transceivers, each of the plurality of transceivers operatively coupling one of the plurality of fourth ports to the signal.

18. The beam forming network system, as defined by claim 9, wherein the plurality of antenna elements is configured in at least one of a circle, a cylinder, a semi-circle, an arc, a line, a sphere, a conformal shape, or a curvilinear shape.

19. The beam forming network system, as defined by claim 9, further comprising at least one fourth beam forming network comprising a plurality of seventh ports and a plurality of eighth ports, each of the plurality of seventh ports being operatively coupled to one of the plurality of sixth ports using at least one of a second variable phase shifter, a second fixed phase shifter, a second attenuator, a second power divider, or a second four-port hybrid coupler.

20. The beam forming network system, as defined by claim 19, wherein the second four-port hybrid coupler comprises at least one of a 90 degree hybrid coupler or a 180 degree hybrid coupler.

21. The beam forming network system, as defined by claim 19, wherein at least one of amplitude or phase is controlled for sidelobe reduction in at least one of azimuth or elevation using at least one of the second variable phase shifter, the second fixed phase shifter, the second attenuator, the second power divider, or the second four-port hybrid coupler.

22. The beam forming network system, as defined by claim 19, wherein each of the plurality of eighth ports is configured to be operatively coupled to the switch, the switch operatively coupling each of the plurality of eighth ports to the signal by sweeping the switch through a plurality of positions.

23. The beam forming network system, as defined by claim 19, wherein each of the plurality of eighth ports is configured to be operatively coupled to one of a plurality of transceivers, each of the plurality of transceivers operatively coupling one of the plurality of eighth ports to the signal.

24. The beam forming network system, as defined by claim 9, wherein the second beam forming network comprises a power divider.

25. A method of beam forming, which comprises:
coupling each of a plurality of first ports associated with at least one first beam forming network operatively to one of a plurality of antenna elements of a circular array antenna; and
coupling each of a plurality of third ports associated with at least one second beam forming network operatively to one of a plurality of second ports associated with the first beam forming network using a first four-port hybrid coupler, the second beam forming network further comprising a plurality of fourth ports and a quantity of the fourth ports being less than a quantity of the plurality of first ports;
sequentially coupling each of the plurality of fourth ports to a signal to enable the plurality of antenna elements to provide sequential 360° coverage in a first operation;
simultaneously coupling each of the plurality of fourth ports to the signal to enable the plurality of antenna elements to provide simultaneous 360° coverage in a second operation; and
selectively coupling a portion of the plurality of fourth ports to the signal to enable the plurality of antenna elements to provide a partial 360° coverage in a third operation;
performing amplitude tapering for sidelobe reduction in either azimuth or elevation using the first four-port hybrid coupler; and
enabling selection of beam crossing width such that a signal-to-noise ratio is increased.

26. The method of beam forming, as defined by claim 25, wherein the first beam forming network is an MN×MN beam forming network, N being an integer greater than or equal to one (1), M being an integer greater than or equal to one (1).

27. The method of beam forming, as defined by claim 25, wherein the second beam forming network is an N×N beam forming network, N being an integer greater than or equal to one (1).

28. The method of beam forming, as defined by claim 25, wherein the first beam forming network is an N×(N+M) beam forming network, N being an integer greater than or equal to one (1), M being an integer greater than or equal to one (1).

29. The method of beam forming, as defined by claim 25, wherein at least one of the first beam forming network or the second beam forming network comprises at least one of a Butler matrix, a Blass matrix, a Nolen matrix, a Shelton matrix, a McFarland matrix, or a Davis matrix.

30. The method of beam forming, as defined by claim 25, wherein the first four-port hybrid coupler comprises at least one of a 90 degree hybrid coupler or a 180 degree hybrid coupler.

31. The method of beam forming, as defined by claim 25, further comprising controlling at least one of amplitude or phase for sidelobe reduction in at least one of azimuth or elevation using at least one of a first variable phase shifter, a first fixed phase shifter, a first attenuator, a first power divider, or the first four-port hybrid coupler.

32. The method of beam forming, as defined by claim 25, wherein the first beam forming network is an N×N beam forming network, N being an integer greater than or equal to one (1).

33. The method of beam forming, as defined by claim 25, further comprising coupling each of the plurality of fourth ports associated with the second beam forming network operatively to a switch, the switch selectively coupling each of the plurality of fourth ports to the signal by sweeping the switch through a plurality of positions.

34. The method of beam forming, as defined by claim 25, further comprising coupling each of the plurality of fourth ports associated with the second beam forming network operatively to one of a plurality of transceivers, each of the plurality of transceivers operatively coupling one of the plurality of fourth ports to the signal.

35. The method of beam forming, as defined by claim 25, wherein the plurality of antenna elements is configured in at least one of a circle, cylinder, a semi-circle, an arc, a line, a sphere, a conformal shape, or curvilinear shape.

36. The method of beam forming, as defined by claim 25, further comprising coupling a plurality of fifth ports associated with at least one third beam forming network operatively to one of the plurality of fourth ports associated with the second beam forming network.

37. The method of beam forming, as defined by claim 36, further comprising coupling each of a plurality of seventh ports associated with at least one fourth beam forming network operatively to one of a plurality of sixth ports associated with the at least one third beam forming network using at least one of a second variable phase shifter, a second fixed phase shifter, a second attenuator, a second power divider, or a second four-port hybrid coupler.

38. The method of beam forming, as defined by claim 37, wherein the second four-port hybrid coupler comprises at least one of a 90 degree hybrid coupler or a 180 degree hybrid coupler.

39. The method of beam forming, as defined by claim 37, further comprising controlling at least one of amplitude or phase for sidelobe reduction in at least one of azimuth or elevation using at least one of the second variable phase shifter, the second fixed phase shifter, the second attenuator, the second power divider, or the second four-port hybrid coupler.

40. The method of beam forming, as defined by claim 37, further comprising coupling a plurality of eighth ports associated with the at least one fourth beam forming network operatively to a switch, the switch operatively coupling each of the plurality of eighth ports to the signal by sweeping the switch through a plurality of positions.

41. The method of beam forming, as defined by claim 37, further comprising coupling a plurality of eighth ports associated with the at least one fourth beam forming network operatively to one of a plurality of transceivers, each of the plurality of transceivers operatively coupling one of the plurality of eighth ports to the signal.

42. The method of beam forming, as defined by claim 25, wherein the second beam forming network comprises a power divider.

* * * * *